United States Patent
Liu et al.

(10) Patent No.: US 11,092,782 B2
(45) Date of Patent: Aug. 17, 2021

(54) CAMERA LENS ASSEMBLY

(71) Applicant: Zhejiang Sunny Optical Co., Ltd, Ningbo (CN)

(72) Inventors: Binbin Liu, Ningbo (CN); Fujian Dai, Ningbo (CN); Jianke Wenren, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 488 days.

(21) Appl. No.: 16/073,570

(22) PCT Filed: Dec. 14, 2017

(86) PCT No.: PCT/CN2017/116155
§ 371 (c)(1),
(2) Date: Jul. 27, 2018

(87) PCT Pub. No.: WO2018/223651
PCT Pub. Date: Dec. 13, 2018

(65) Prior Publication Data
US 2021/0048624 A1    Feb. 18, 2021

(30) Foreign Application Priority Data

Jun. 8, 2017  (CN) .......................... 201710425811.X
Jun. 8, 2017  (CN) .......................... 201720658754.5

(51) Int. Cl.
G02B 13/00    (2006.01)
G02B 9/64     (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2018/0196226 A1* 7/2018 Chang ................ G02B 13/0045

FOREIGN PATENT DOCUMENTS

| CN | 106324811 | 1/2017 |
| CN | 107015347 | 8/2017 |
| CN | 206946079 | 1/2018 |

* cited by examiner

*Primary Examiner* — Darryl J Collins
*Assistant Examiner* — Matthew Y Lee
(74) *Attorney, Agent, or Firm* — Hauptman Ham, LLP

(57) ABSTRACT

The present disclosure discloses a camera lens assembly includes, sequentially along an optical axis from an object side to an image side, a first lens, a second lens, a third lens, a fourth lens, a fifth lens, a sixth lens and a seventh lens. The first lens has a positive refractive power. At least one of the second lens, the third lens, or the fourth lens has a positive refractive power or a negative refractive power. The fifth lens has a positive refractive power, and an image-side surface of the fifth lens is a convex surface. The sixth lens has a negative refractive power. The seventh lens has a negative refractive power, and an object-side surface of the seventh lens is a convex surface. An effective focal length f1 of the first lens and an effective focal length f5 of the fifth lens satisfy: $1.5 < f1/f5 < 3.5$.

16 Claims, 14 Drawing Sheets

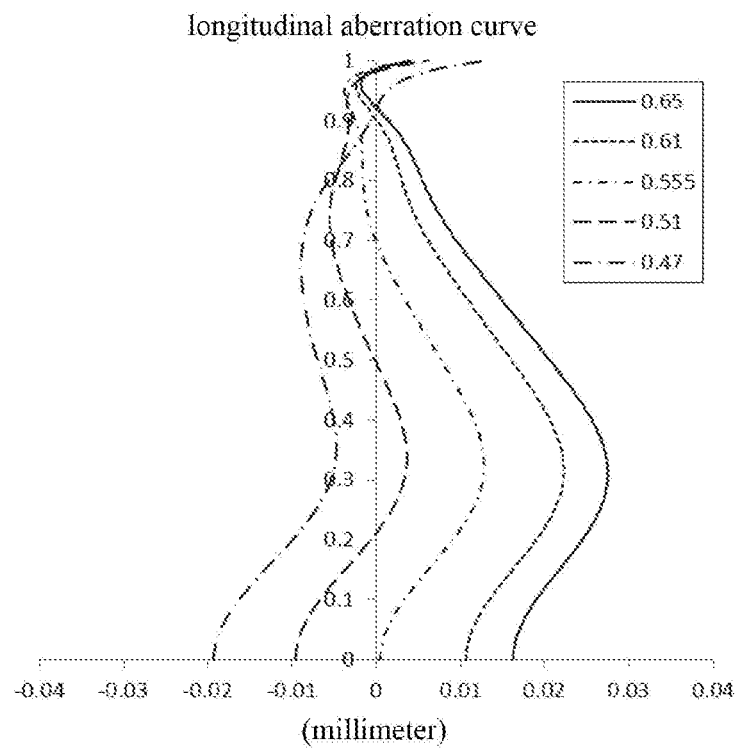
Fig. 2A
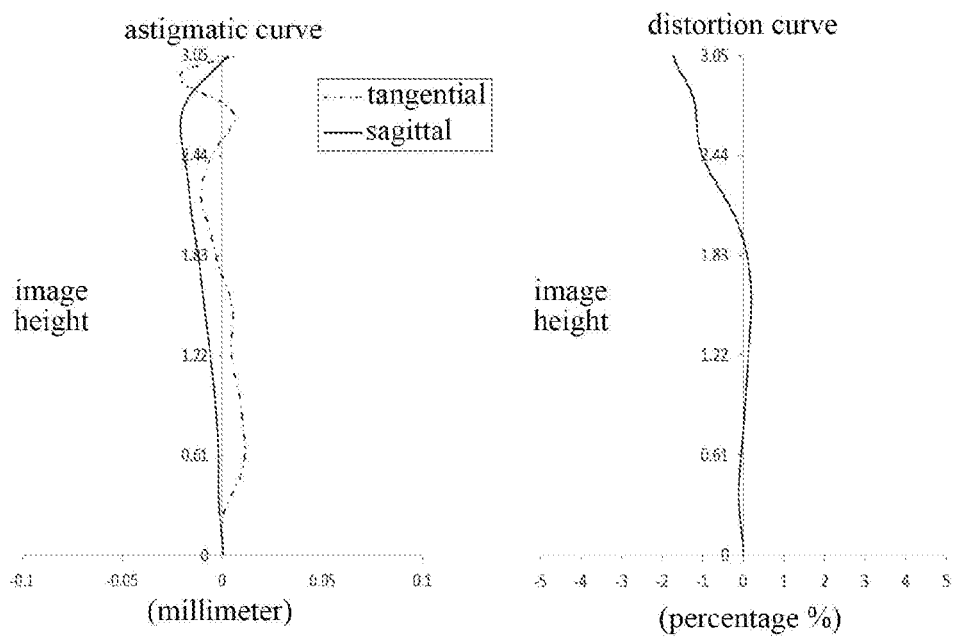
Fig. 2B
Fig. 2C

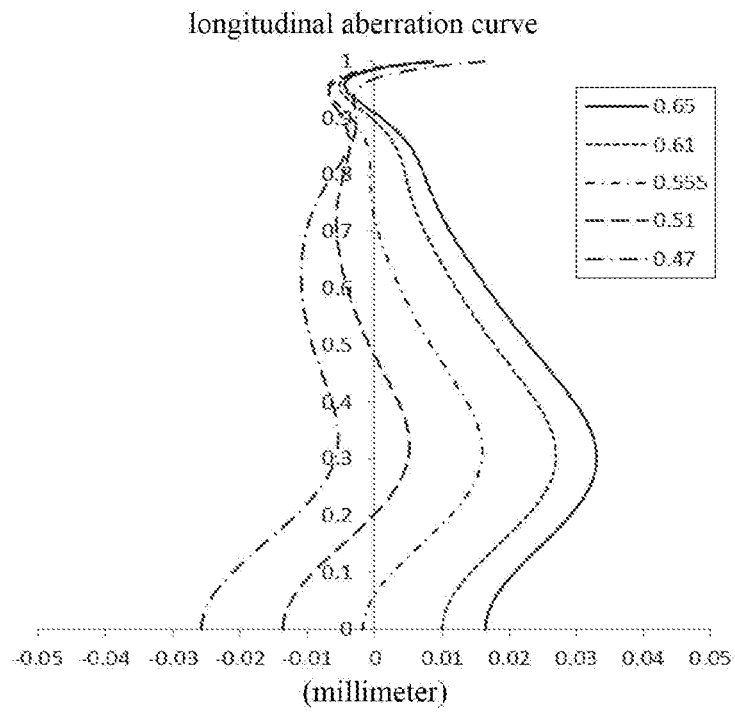
Fig. 4A
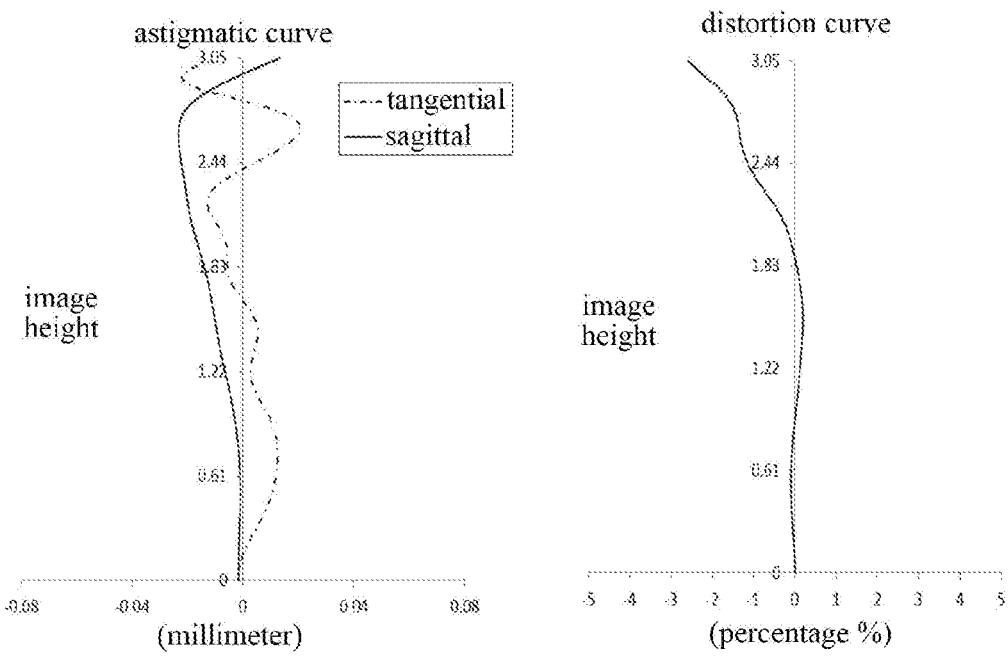
Fig. 4B
Fig. 4C

CAMERA LENS ASSEMBLY

RELATED APPLICATIONS

The present application is a National Phase of International Application Number PCT/CN2017/116155, filed Dec. 14, 2017, and claims the priority of China Application No. 201710425811.X, filed Jun. 8, 2017; and China Application No. 201720658754.5, filed Jun. 8, 2017.

TECHNICAL FIELD

The present disclosure relates to a camera lens assembly, and more specifically, relates to a camera lens assembly comprising seven lenses.

BACKGROUND

As the science and technology develop, wide-angle lens assemblies can be applied on more occasions, and due to their unique functionalities compared to ordinary lens assemblies, they are increasingly favoured by various manufacturers and customers. The short focal length and the large depth of field of the wide-angle lens assembly can ensure that the scenery in front of or behind the photographed subject may be clearly reproduced on the picture, which is very conducive to photographing. The wide-angle lens assembly also features a wide field-of-view. Under the same condition, it can acquire more information, which is a very important application feature in the fields of security lens assembly, vehicle-mounted lens assembly, etc. At present, a typical wide-angle lens assembly mainly adopts an all-glass structure, having a long total length and an average image quality.

With the increasing development of portable electronic products such as mobile phones and tablet computers, they have become thinner and smaller in volume, especially the 360-degree around-viewing application currently having a growing market, which has brought forward higher requirements on performances of the camera lens assembly such as miniaturization, lightweight, wide-angle and image quality. In order to satisfy the miniaturization, it is necessary to reduce the number of lenses of the imaging lens assembly as far as possible. However, the lack of design freedom caused thereby will make it hard to satisfy the market demand on the high imaging performances. In order to ensure high resolution, obtain a large viewing angle and satisfy the miniaturization at the same time, using a small number of lenses is not conducive to achieving the high-pixel demand, and will limit a high-pixel, large field-of-view camera lens module.

Therefore, the present disclosure aims to provide a wide-angel, miniaturized camera lens assembly having high imaging quality.

SUMMARY

The technical solution provided by the present disclosure at least partially solves the technical problems described above.

According to one aspect, the present disclosure provides a camera lens assembly. The camera lens assembly includes, sequentially along an optical axis from an object side to an image side, a first lens, a second lens, a third lens, a fourth lens, a fifth lens, a sixth lens and a seventh lens. The first lens may have a positive refractive power. At least one of the second lens, the third lens, or the fourth lens has a positive refractive power or a negative refractive power. The fifth lens may have a positive refractive power, and an image-side surface of the fifth lens is a convex surface. The sixth lens may have a negative refractive power. The seventh lens may have a negative refractive power, and an object-side surface of the seventh lens is a convex surface. An effective focal length f1 of the first lens and an effective focal length f5 of the fifth lens satisfy: $1.5<f1/f5<3.5$, for example, $2.10 \leq f1/f5 \leq 3.44$.

According to another aspect, the present disclosure further provides a camera lens assembly. The camera lens assembly includes, sequentially along an optical axis from an object side to an image side, a first lens, a second lens, a third lens, a fourth lens, a fifth lens, a sixth lens and a seventh lens. The first lens may have a positive refractive power. At least one of the second lens, the third lens, or the fourth lens has a positive refractive power or a negative refractive power. The fifth lens may have a positive refractive power, and an image-side surface of the fifth lens is a convex surface. The sixth lens may have a negative refractive power. The seventh lens may have a negative refractive power, and an object-side surface of the seventh lens is a convex surface. Half of a diagonal length ImgH of an effective pixel area of an electronic photosensitive element of the camera lens assembly and an effective focal length f of the camera lens assembly may satisfy: $ImgH/f>0.85$, for example, $ImgH/f \geq 1.01$.

According to another aspect, the present disclosure further provides a camera lens assembly. The camera lens assembly includes, sequentially along an optical axis from an object side to an image side, a first lens, a second lens, a third lens, a fourth lens, a fifth lens, a sixth lens and a seventh lens. The first lens may have a positive refractive power. At least one of the second lens, the third lens, or the fourth lens has a positive refractive power or a negative refractive power. The fifth lens may have a positive refractive power, and an image-side surface of the fifth lens is a convex surface. The sixth lens may have a negative refractive power. The seventh lens may have a negative refractive power, and an object-side surface of the seventh lens is a convex surface. An effective radius DT12 of an image-side surface of the first lens and an effective radius DT22 of an image-side surface of the second lens may satisfy: $0.7<DT12/DT22<1$, for example, $0.86 \leq DT12/DT22 \leq 0.89$.

In an implementation, the third lens may optionally have a positive refractive power or a negative refractive power, an object-side surface of the third lens is a convex surface, and an image-side surface of the third lens is a concave surface.

In an implementation, the second lens, the third lens, and the fourth lens each optionally has a positive refractive power or a negative refractive power.

In an implementation, a distance TTL from an object-side surface of the first lens to an image plane of the camera lens assembly on the optical axis and the half of the diagonal length ImgH of the effective pixel area of the electronic photosensitive element of the camera lens assembly may satisfy: $TTL/ImgH<1.5$, for example, $TTL/ImgH \leq 1.46$.

In an implementation, a radius of curvature R5 of the object-side surface of the third lens and a radius of curvature R6 of the image-side surface of the third lens may satisfy: $0.8<R5/R6<1.3$, for example, $0.81 \leq R5/R6 \leq 1.26$.

In an implementation, a center thickness CT5 of the fifth lens on the optical axis and a center thickness CT7 of the seventh lens on the optical axis may satisfy: $2.2<CT5/CT7<3$, for example, $2.78 \leq CT5/CT7 \leq 2.97$.

In an implementation, a center thickness CT6 of the sixth lens on the optical axis, the center thickness CT7 of the seventh lens on the optical axis and the center thickness CT5 of the fifth lens on the optical axis may satisfy: $0.5<(CT6+CT7)/CT5<1$, for example, $0.66\leq(CT6+CT7)/CT5\leq0.69$.

In an implementation, a sum of spacing distances ΣT between any two adjacent lenses from the first lens to the seventh lens on the optical axis and the distance TTL from the object-side surface of the first lens to the image plane of the camera lens assembly on the optical axis may satisfy: $\Sigma T/TTL<0.2$, for example, $\Sigma T/TTL\leq0.16$.

In an implementation, it satisfies: $0.7<SAG61/SAG62<1.5$, for example, $0.79\leq SAG61/SAG62\leq1.46$, wherein SAG61 is a distance from an intersection point of an object-side surface of the sixth lens and the optical axis to a vertex of an effective radius of the object-side surface of the sixth lens on the optical axis, and SAG62 is a distance from an intersection point of an image-side surface of the sixth lens and the optical axis to a vertex of an effective radius of the image-side surface of the sixth lens on the optical axis.

In an implementation, the object-side surface of the first lens may be a convex surface, and the image-side surface of the first lens is a concave surface. An object-side surface of the second lens may be a convex surface, and the image-side surface of the second lens is a concave surface. An object-side surface of the fourth lens may be a convex surface, and an image-side surface of the fourth lens is a concave surface. The object-side surface of the sixth lens may be a convex surface, and the image-side surface of the sixth lens is a concave surface. An image-side surface of the seventh lens may be a concave surface.

The camera lens assembly configured as described above may further have at least one of the advantageous effects such as wide-angle, miniaturization, ultra-thinning, high image quality, low sensitivity, and balanced aberration.

BRIEF DESCRIPTION OF THE DRAWINGS

The above and other advantages of implementations of the present disclosure will become apparent from the detailed description with reference to the following accompanying drawings. The accompany drawings are intended to illustrate the exemplary implementations of the present disclosure rather than limiting them. In the accompanying drawings:

FIG. 2A, FIG. 2B and FIG. 2C illustrate a longitudinal aberration curve, an astigmatic curve and a distortion curve of the camera lens assembly according to Embodiment 1, respectively;

FIG. 4A, FIG. 4B and FIG. 4C illustrate a longitudinal aberration curve, an astigmatic curve and a distortion curve of the camera lens assembly according to Embodiment 2, respectively;

DETAILED DESCRIPTION OF EMBODIMENTS

Figure 1:
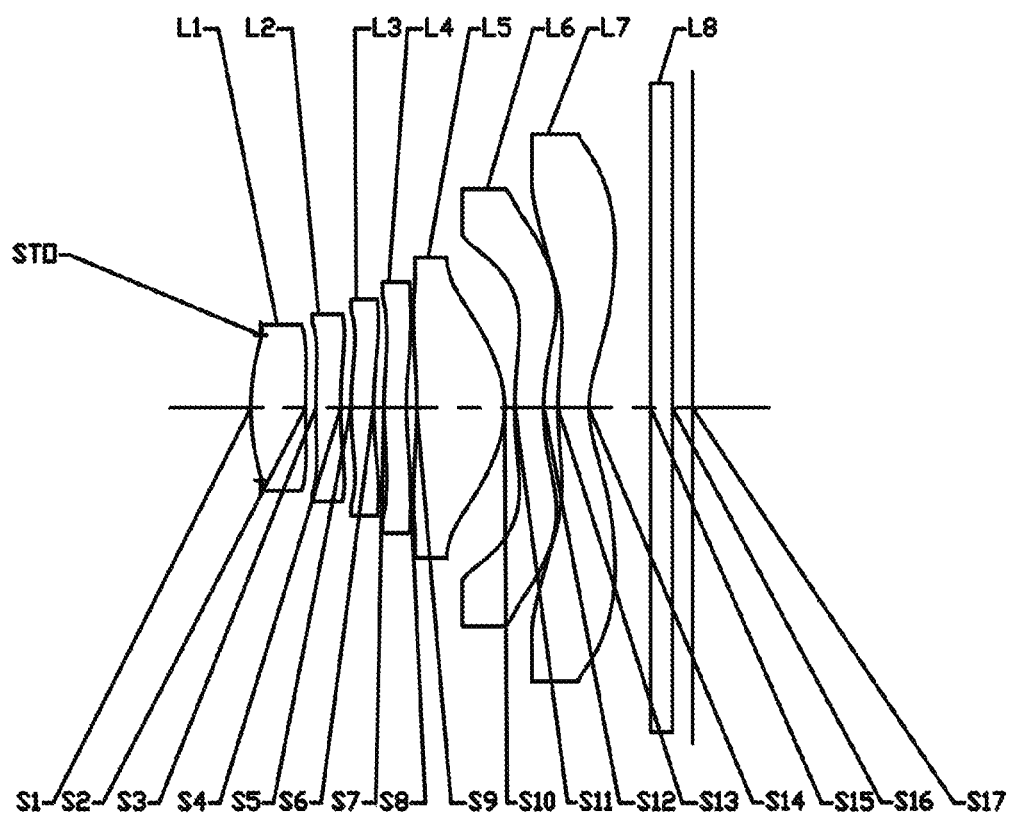
FIG. 1 is a schematic structural diagram illustrating a camera lens assembly according to Embodiment 1 of the present disclosure.

For a better understanding of the present disclosure, various aspects of the present disclosure will be described in more detail with reference to the accompanying drawings. It should be understood that the detailed description is merely illustrative of exemplary implementations of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions of the first, the second, etc. are used only to distinguish one feature from another, without indicating any limitation to the feature. Thus, the first lens discussed below may also be referred to as the second lens without departing from the teachings of the present disclosure.

In the accompanying drawings, the thickness, size and shape of the lens have been slightly exaggerated for the convenience of explanation. Specifically, shapes of spherical surfaces or aspheric surfaces shown in the accompanying drawings are shown by way of examples. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

It should be further understood that the terms "comprising," "including," "having" and variants thereof, when used in this specification, specify the presence of stated features, unities, steps, operations, elements and/or components, but do not exclude the presence or addition of one or more other features, unities, steps, operations, elements, components and/or combinations thereof. In addition, expressions, such as "at least one of," when appearing after a list of listed features, modify the entire list of features rather than an individual element in the list. Further, the use of "may,"

when describing the implementations of the present disclosure, relates to "one or more implementations of the present disclosure." In addition, the term "exemplary" is intended to refer to an example or illustration.

As used herein, the terms "substantially," "approximately" and the like are used to indicate an approximation rather than a degree, and are intended to be illustrative of the inherent deviations of measured or calculated values as recognized by those of ordinary skill in the art.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the related art and will not be interpreted in an idealized or overly formal sense unless expressly so defined herein.

In addition, the paraxial area refers to an area near the optical axis. The first lens is the lens closest to the object and the seventh lens is the lens closest to the photosensitive element. In this text, the surface closest to the object in each lens is referred to as the object-side surface, and the surface closest to the image plane in each lens is referred to as the image-side surface.

It should be noted that the embodiments in the present disclosure and the features in the embodiments may be combined with each other on a non-conflict basis. The present disclosure will be described below in detail with reference to the accompanying drawings and in combination with the embodiments.

The present disclosure is further described below with reference to the specific embodiments.

The camera lens assembly according to the exemplary implementations of the present disclosure has, for example, seven lenses, i.e., a first lens, a second lens, a third lens, a fourth lens, a fifth lens, a sixth lens and a seventh lens. These seven lenses are arranged in sequence along an optical axis from an object side to an image side.

In the exemplary implementations, the first lens may have a positive refractive power. The second lens may optionally have a positive refractive power or a negative refractive power. The third lens may optionally have a positive refractive power or a negative refractive power, an object-side surface of the third lens is a convex surface, and an image-side surface of the third lens is a concave surface. The fourth lens may optionally have a positive refractive power or a negative refractive power. The fifth lens may have a positive refractive power, and an image-side surface of the fifth lens is a convex surface. The sixth lens may have a negative refractive power. The seventh lens may have a negative refractive power, and an object-side surface of the seventh lens is a convex surface. By properly controlling the allocation of positive and negative refractive power to each lens, a low-order aberration of the system may be effectively balanced and controlled, so that the camera lens assembly can obtain superior imaging quality.

In the exemplary implementations, an effective focal length f1 of the first lens and an effective focal length f5 of the fifth lens may satisfy: $1.5<f1/f5<3.5$, and more specifically, may further satisfy: $2.10\le f1/f5\le 3.44$. By properly allocating the refractive power, it is beneficial to the balance of aberrations to improve the imaging quality, enlarge the field-of-view angle of the camera lens assembly, and at the same time shorten the total length of the lens assembly and ensure the miniaturization characteristic of the lens assembly.

In the exemplary implementations, half of a diagonal length ImgH of an effective pixel area of an electronic photosensitive element of the camera lens assembly and an effective focal length f of the camera lens assembly may satisfy: $ImgH/f>0.85$, and more specifically, may further satisfy: $ImgH/f\ge 1.01$. By properly selecting the ratio of ImgH to f, the length of the lens assembly may be effectively controlled under the condition of realizing large field-of-view angle imaging, which is conducive to the realizing of the miniaturization of the camera lens assembly.

In the exemplary implementations, an effective radius DT12 of an image-side surface of the first lens and an effective radius DT22 of an image-side surface of the second lens may satisfy: $0.7<DT12/DT22<1$, and more specifically, may further satisfy: $0.86\le DT12/DT22\le 0.89$. Through this configuration, the compression of the lateral size of the camera lens assembly is realized, which helps to ensure the miniaturization of the lens assembly.

In the exemplary implementations, a distance TTL from an object-side surface of the first lens to an image plane of the camera lens assembly on the optical axis and the half of the diagonal length ImgH of the effective pixel area of the electronic photosensitive element of the camera lens assembly may satisfy: $TTL/ImgH<1.5$, and more specifically, may further satisfy: $TTL/ImgH\le 1.46$. Through this configuration, it is avoided that the lens assembly is too long in length due to the parameter being too large, which is conducive to ensuring the ultra-thin characteristic of the lens assembly.

In the exemplary implementations, a radius of curvature R5 of the object-side surface of the third lens and a radius of curvature R6 of the image-side surface of the third lens may satisfy: $0.8<R5/R6<1.3$, and more specifically, may further satisfy: $0.81\le R5/R6\le 1.26$. By the proper allocation of the radius of curvature to the third lens, an axial aberration may be reduced while the sensitivity of the lens assembly is eased.

In the exemplary implementations, the center thickness CT5 of the fifth lens on the optical axis and a center thickness CT7 of the seventh lens on the optical axis may satisfy: $2.2<CT5/CT7<3$, and more specifically, may further satisfy: $2.78\le CT5/CT7\le 2.97$. And in the exemplary implementations, a center thickness CT6 of the sixth lens on the optical axis, the center thickness CT7 of the seventh lens on the optical axis and the center thickness CT5 of the fifth lens on the optical axis may satisfy: $0.5<(CT6+CT7)/CT5<1$, and more specifically, may further satisfy: $0.66\le (CT6+CT7)/CT5<1\le 0.69$. Through this configuration, it effectively reduces a distortion and a coma aberration while enlarging the field-of-view angle of the lens assembly, which is conducive to the balance of the aberrations and ensuring high imaging quality of the camera lens assembly.

In the exemplary implementations, a sum of spacing distances $\Sigma T$ between any two adjacent lenses from the first lens to the seventh lens on the optical axis and the distance TTL from the object-side surface of the first lens to the image plane of the camera lens assembly on the optical axis may satisfy: $\Sigma T/TTL<0.2$, and more specifically, may further satisfy: $\Sigma T/TTL\le 0.16$. By properly arranging the size structure of the lenses, it is beneficial to improve the processability of the lenses and the assembling process of the lens assembly.

In the exemplary implementations, it may satisfy: $0.7<SAG61/SAG62<1.5$, and more specifically, may further satisfy: $0.79\le SAG61/SAG62\le 1.46$. Here, SAG61 is a distance from an intersection point of an object-side surface of the sixth lens and the optical axis to a vertex of an effective radius of the object-side surface of the sixth lens on the optical axis, and SAG62 is a distance from an intersection point of an image-side surface of the sixth lens and the optical axis to a vertex of an effective radius of the image-side surface of the sixth lens on the optical axis. Such configuration benefits the balance of the axial aberration, while reduces the light paths of ghost image incoming the image plane, and eases the light angle, improves the imaging quality of the lens assembly.

In the exemplary implementations, the object-side surface of the first lens is a convex surface, and the image-side surface of the first lens is a concave surface. An object-side surface of the second lens is a convex surface, and the image-side surface of the second lens is a concave surface. An object-side surface of the fourth lens is a convex surface, and an image-side surface of the fourth lens is a concave surface. The object-side surface of the sixth lens is a convex surface, and the image-side surface of the sixth lens is a concave surface. An image-side surface of the seventh lens is a concave surface. By a proper allocation of the curvatures to the lenses, the axial aberration may be reduced, while the sensitivity of the lens assembly is eased.

In the exemplary implementations, the camera lens assembly may also be provided with an aperture STO for limiting light beams, adjusting the amount of incoming light, and improving the imaging quality. The camera lens assembly according to the above implementations of the present disclosure may adopt multiple lenses, for example, seven lenses as described in the preceding text. By properly allocating to each lens the refractive power, the surface type, the center thickness, and the axial spacing distance between the lenses, etc., it effectively enlarges the aperture of the camera lens assembly, reduces the system sensitivity, ensures the miniaturization of the lens assembly, and improves the imaging quality, thus making the camera lens assembly more conducive to the production and processing and may be applicable to portable electronic products. In the implementations of the present disclosure, at least one of the mirror surfaces of the lenses is an aspheric mirror surface. The feature of the aspheric lens is: from the center of the lens to the periphery, the curvature is continuously changing. Unlike the spherical lens with a constant curvature from the center of the lens to the periphery, the aspheric lens has a better radius-of-curvature characteristic, having advantages of improving a distortion aberration and improving an astigmatic aberration, capable of making the field-of-view larger and more realistic. Using the aspheric lens, an aberration occurred at the time of imaging can be eliminated as far as possible, thereby improving the imaging quality. In addition, the use of the aspheric lens may also effectively reduce the number of lenses in the optical system.

However, it should be understood by those skilled in the art that the various results and advantages described in the present specification may be obtained by changing the number of the lenses constituting the lens assembly without departing from the technical solution claimed by the present disclosure. For example, although seven lenses are described as an example in the implementations, the camera lens assembly is not limited to including seven lenses. If desired, the camera lens assembly may also include other numbers of lenses.

Specific embodiments of the camera lens assembly that may be applied to the above implementations are further described below with reference to the accompanying drawings.

Embodiment 1

The camera lens assembly according to Embodiment 1 of the present disclosure is described below with reference to FIG. 1 to FIG. 2C.

FIG. 1 illustrates a schematic structural diagram of the camera lens assembly according to Embodiment 1 of the present disclosure. As shown in FIG. 1, the camera lens assembly along an optical axis includes seven lenses L1-L7 from an object side to an image side arranged in sequence. The first lens L1 has an object-side surface S1 and an image-side surface S2; the second lens L2 has an object-side surface S3 and an image-side surface S4; the third lens L3 has an object-side surface S5 and an image-side surface S6; the fourth lens L4 has an object-side surface S7 and an image-side surface S8; the fifth lens L5 has an object-side surface S9 and an image-side surface S10; the sixth lens L6 has an object-side surface S11 and an image-side surface S12; and the seventh lens L7 has an object-side surface S13 and an image-side surface S14.

In this embodiment, the first lens has a positive refractive power. The second lens has a negative refractive power. The third lens has a positive refractive power, the object-side surface of the third lens is a convex surface, and the image-side surface of the third lens is a concave surface. The fourth lens has a positive refractive power. The fifth lens has a positive refractive power, and the image-side surface of the fifth lens is a convex surface. The sixth lens may have a negative refractive power. The seventh lens may have a negative refractive power, and the object-side surface of the seventh lens is a convex surface. In the camera lens assembly of the present embodiment, an aperture STO for limiting light beams is also included. The camera lens assembly according to Embodiment 1 may include an optical filter L8 having an object-side surface S15 and an image-side surface S16, and the optical filter L8 may be used to correct color deviations. Light from an object passes through the surfaces S1 to S16 sequentially and finally images on the image plane S17.

Table 1 shows the surface type, the radius of curvature, the thickness, the material and the conic coefficient of each lens of the camera lens assembly in Embodiment 1.

TABLE 1

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.0956 | | | |
| S1 | aspheric | 1.9424 | 0.5333 | 1.546 | 56.11 | −0.1287 |
| S2 | aspheric | 10.3790 | 0.1000 | | | −98.1771 |
| S3 | aspheric | 8.9003 | 0.2400 | 1.656 | 21.52 | −15.8186 |
| S4 | aspheric | 4.2187 | 0.1000 | | | −54.7500 |
| S5 | aspheric | 2.9284 | 0.2180 | 1.656 | 21.52 | −16.8673 |
| S6 | aspheric | 3.0582 | 0.1000 | | | −32.8234 |

TABLE 1-continued

| surface number | surface type | radius of curvature | thickness | material refractive index | abbe number | conic coefficient |
|---|---|---|---|---|---|---|
| S7 | aspheric | 3.2335 | 0.2186 | 1.656 | 21.52 | −91.2429 |
| S8 | aspheric | 3.7748 | 0.1000 | | | −20.9871 |
| S9 | aspheric | −3.9793 | 0.8529 | 1.546 | 56.11 | −99.0000 |
| S10 | aspheric | −0.9363 | 0.1000 | | | −2.9097 |
| S11 | aspheric | 3.8657 | 0.2800 | 1.656 | 21.52 | −86.2697 |
| S12 | aspheric | 2.2722 | 0.1376 | | | −39.5857 |
| S13 | aspheric | 2.9276 | 0.3012 | 1.546 | 56.11 | 0.5880 |
| S14 | aspheric | 0.9163 | 0.5982 | | | −4.8161 |
| S15 | spherical | infinite | 0.2100 | 1.517 | 64.17 | |
| S16 | spherical | infinite | 0.1951 | | | |
| S17 | spherical | infinite | | | | |

As may be obtained from Table 1, the radius of curvature R5 of the object-side surface S5 of the third lens L3 and the radius of curvature R6 of the image-side surface S6 of the third lens L3 satisfy: R5/R6=0.96. The center thickness CT5 of the fifth lens L5 on the optical axis and the center thickness CT7 of the seventh lens L7 on the optical axis satisfy: CT5/CT7=2.83. The center thickness CT6 of the sixth lens L6 on the optical axis, the center thickness CT7 of the seventh lens L7 on the optical axis, and the center thickness CT5 of the fifth lens L5 on the optical axis satisfy: (CT6+CT7)/CT5=0.68.

In the present embodiment, seven lenses are used as an example. By properly allocating the focal length and the surface type to each lens, the aperture of the lens assembly is effectively enlarged, and the total length of the lens assembly is shortened, thereby ensuring the large aperture and the miniaturization of the lens assembly. At the same time, various types of aberrations are corrected, and the resolution and the imaging quality of the lens assembly are improved. The surface type x of each aspheric surface is defined by the following formula:

$$x = \frac{ch^2}{1 + \sqrt{1 - (k+1)c^2h^2}} + \Sigma Aih^i \quad (1)$$

Here, x is the distance sagittal height from the apex of the aspheric surface when the aspheric surface is at a height of h along the optical axis; c is the paraxial curvature of the aspheric surface, and c=1/R (i.e., the paraxial curvature c is the reciprocal of the radius of curvature R in Table 1 above); k is the conic coefficient (given in Table 1 above); and Ai is the correction coefficient of the $i^{th}$ order of the aspheric surface. Table 2 below shows higher-order coefficients $A_4$, $A_6$, $A_8$, $A_{10}$, $A_{12}$, $A_{14}$, $A_{16}$, Anand $A_{20}$ applicable to each mirror surface S1-S14 in Embodiment 1.

TABLE 2

| surface number | A4 | A6 | A8 | A10 | A12 |
|---|---|---|---|---|---|
| S1 | −3.4650E−02 | 2.3763E−01 | −2.2936E+00 | 1.0991E+01 | −3.0410E+01 |
| S2 | −8.1477E−02 | −1.8510E−01 | −1.4569E−01 | 4.4670E−02 | 2.6657E−01 |
| S3 | −5.6292E−02 | −3.5427E−02 | −1.0455E+00 | 3.0171E+00 | −6.2839E+00 |
| S4 | −1.3414E−04 | 2.4524E−02 | −3.7309E−01 | 2.8785E−01 | −2.3123E−01 |
| S5 | −1.6525E−01 | 4.5296E−01 | −2.3151E+00 | 5.9779E+00 | −9.5069E+00 |
| S6 | −6.2011E−02 | 1.7440E−01 | −7.2950E−01 | 1.1192E+00 | −8.7350E−01 |
| S7 | 9.3202E−02 | −1.0357E+00 | 2.9454E+00 | −5.1502E+00 | 5.5519E+00 |
| S8 | 5.6393E−02 | −5.3398E−01 | 1.1300E+00 | −1.5075E+00 | 1.2679E+00 |
| S9 | 3.2529E−02 | 1.6914E−01 | −5.5353E−01 | 7.6587E−01 | −5.3169E−01 |
| S10 | −1.8700E−02 | −3.0740E−01 | 8.2068E−01 | −1.1226E+00 | 8.8122E−01 |
| S11 | 2.2086E−01 | −7.4670E−01 | 8.1107E−01 | −3.4640E−01 | −2.3804E−01 |
| S12 | 4.5781E−01 | −1.1890E+00 | 1.4867E+00 | −1.2329E+00 | 6.8379E−01 |
| S13 | −2.3867E−01 | 1.3131E−01 | −1.5371E−01 | 1.4971E−01 | −8.1021E−02 |
| S14 | −2.1239E−01 | 1.6761E−01 | −9.3202E−02 | 4.0218E−02 | −1.3367E−02 |

| surface number | A14 | A16 | A18 | A20 |
|---|---|---|---|---|
| S1 | 4.4106E+01 | −2.6230E+01 | 0.0000E+00 | 0.0000E+00 |
| S2 | −4.7196E−01 | 4.7740E−01 | 0.0000E+00 | 0.0000E+00 |
| S3 | 7.4004E+00 | −3.2727E+00 | 0.0000E+00 | 0.0000E+00 |
| S4 | 3.2472E−01 | −1.5224E−01 | 0.0000E+00 | 0.0000E+00 |
| S5 | 8.1813E+00 | −2.7843E+00 | 0.0000E+00 | 0.0000E+00 |
| S6 | 3.2202E−01 | −1.7554E−02 | 0.0000E+00 | 0.0000E+00 |
| S7 | −3.3293E+00 | 8.3960E−01 | 0.0000E+00 | 0.0000E+00 |
| S8 | −5.9278E−01 | 1.1668E−01 | 0.0000E+00 | 0.0000E+00 |
| S9 | 1.8481E−01 | −2.6861E−02 | 0.0000E+00 | 0.0000E+00 |
| S10 | −3.5204E−01 | 5.5063E−02 | 0.0000E+00 | 0.0000E+00 |
| S11 | 4.0207E−01 | −2.2356E−01 | 5.8242E−02 | −5.9305E−03 |
| S12 | −2.4525E−01 | 5.4010E−02 | −6.6001E−03 | 3.4142E−04 |
| S13 | 2.5107E−02 | −4.4994E−03 | 4.3615E−04 | −1.7776E−05 |
| S14 | 3.1036E−03 | −4.5409E−04 | 3.6958E−05 | −1.2659E−06 |

Table 3 below shows the effective focal lengths f1 to f7 of the lenses, the total effective focal length f of the imaging lens assembly of the camera lens assembly, the half of the diagonal length ImgH of the effective pixel area of the electronic photosensitive element of the camera lens assembly, the half of the maximal field-of-view HFOV of the camera lens assembly, and the distance TTL from the object-side surface S1 of the first lens L1 to the image plane S17 of the camera lens assembly on the optical axis in Embodiment 1.

TABLE 3

| | |
|---|---|
| ImgH(mm) | 3.05 |
| HFOV(°) | 46.14/46.1 |
| f(mm) | 2.99 |
| f1(mm) | 4.28 |
| f2(mm) | −12.47 |
| f3(mm) | 63.11 |
| f4(mm) | 29.61 |
| f5(mm) | 2.04 |
| f6(mm) | −9.03 |
| f7(mm) | −2.58 |
| TTL(mm) | 4.29 |

According to Table 3, the effective focal length f1 of the first lens and the effective focal length f5 of the fifth lens satisfy: f1/f5=2.1. The half of the diagonal length ImgH of the effective pixel area of the electronic photosensitive element of the camera lens assembly and the effective focal length f of the camera lens assembly satisfy: ImgH/f=1.02. The distance TTL from the object-side surface of the first lens to the image plane of the camera lens assembly on the optical axis and the half of the diagonal length ImgH of the effective pixel area of the electronic photosensitive element of the camera lens assembly satisfy: TTL/ImgH=1.4. The sum of spacing distances ET between any two adjacent lenses from the first lens to the seventh lens on the optical axis and the distance TTL from the object-side surface of the first lens to the image plane of the camera lens assembly on the optical axis satisfy: ΣT/TTL=0.15.

In this embodiment, the effective radius DT12 of the image-side surface of the first lens and the effective radius DT22 of the image-side surface of the second lens satisfy: DT12/DT22=0.89. And SAG61/SAG62=0.79, SAG61 is the distance from the intersection point of the object-side surface of the sixth lens and the optical axis to the vertex of the effective radius of the object-side surface of the sixth lens on the optical axis, and SAG62 is the distance from the intersection point of the image-side surface of the sixth lens and the optical axis to the vertex of the effective radius of the image-side surface of the sixth lens on the optical axis.

FIG. 2A shows a longitudinal aberration curve of the camera lens assembly according to Embodiment 1, representing deviations of focal points of light of different wavelengths converged after passing through a camera lens assembly. FIG. 2B shows an astigmatic curve of the camera lens assembly according to Embodiment 1, representing a curvature of a tangential image plane and a curvature of a sagittal image plane. FIG. 2C shows a distortion curve of the camera lens assembly according to Embodiment 1, representing amounts of distortion at different viewing angles. It can be seen from FIG. 2A to FIG. 2C that the camera lens assembly according to Embodiment 1 can achieve good imaging quality.

Embodiment 2

The camera lens assembly according to Embodiment 2 of the present disclosure is described below with reference to FIG. 3 to FIG. 4C. In addition to the parameters of the lenses of the camera lens assembly, for example, in addition to the radius of curvature, the thickness, the conic coefficient, the effective focal length, the axial spacing distance of each lens, the higher-order coefficients of each lens, and the like, the camera lens assembly described in the present Embodiment 2 and the following embodiments is same in arrangement and structure with the camera lens assembly described in Embodiment 1. For the purpose of brevity, the description of parts similar to those in Embodiment 1 will be omitted.

Figure 3:
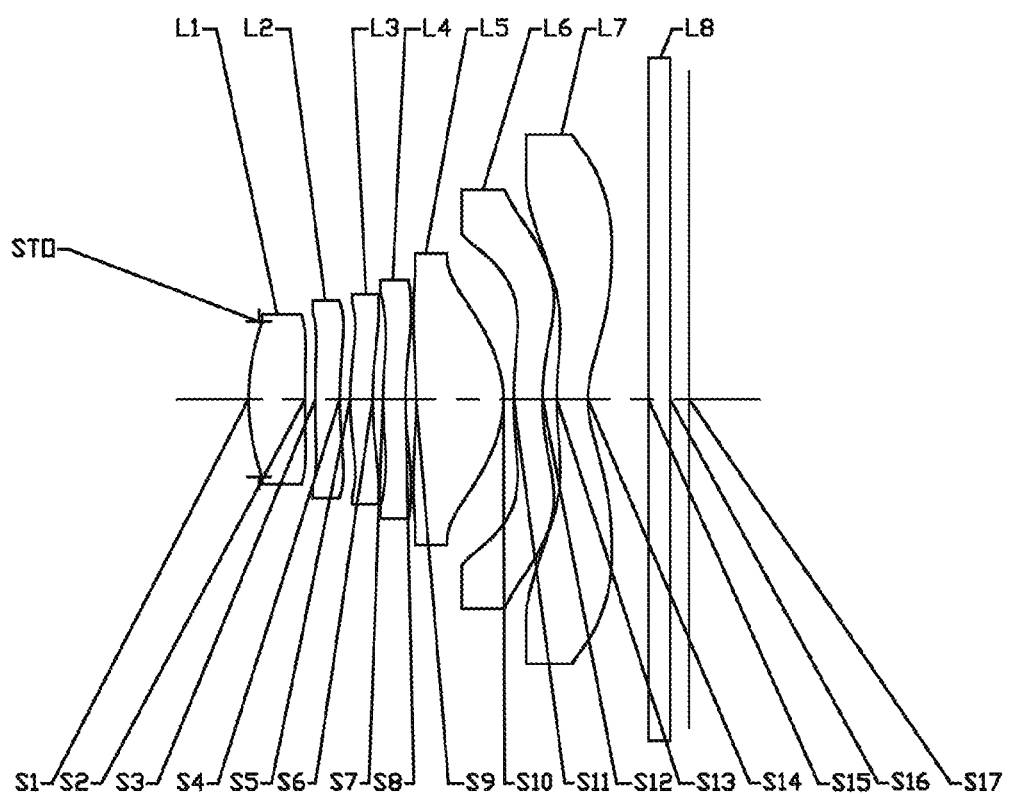
FIG. 3 is a schematic structural diagram illustrating a camera lens assembly according to Embodiment 2 of the present disclosure.

FIG. 3 illustrates a schematic structural diagram of the camera lens assembly according to Embodiment 2 of the present disclosure. As shown in FIG. 3, the camera lens assembly according to Embodiment 2 includes the first to seventh lenses L1 to L7 each having an object-side surface and an image-side surface. Table 4 below shows the surface type, the radius of curvature, the thickness, the material and the conic coefficient of each lens of the camera lens assembly in Embodiment 2. Table 5 shows higher-order coefficients of each aspheric mirror surface in Embodiment 2. Table 6 shows the effective focal lengths f1 to f7 of the lenses, the total effective focal length f of the imaging lens assembly of the camera lens assembly, the half of the diagonal length ImgH of the effective pixel area of the electronic photosensitive element of the camera lens assembly, the half of the maximal field-of-view HFOV of the camera lens assembly, and the distance TTL from the object-side surface S1 of the first lens L1 to the image plane S17 of the camera lens assembly on the optical axis in Embodiment 2. Here, each aspheric surface type may be defined by the formula (1) given in the above Embodiment 1.

TABLE 4

| surface number | surface type | radius of curvature | thickness | material | | conic coefficient |
|---|---|---|---|---|---|---|
| | | | | refractive index | abbe number | |
| OBJ | spherical | infinite | infinite | | | |
| STO | spherical | infinite | −0.1017 | | | |
| S1 | aspheric | 1.9248 | 0.5483 | 1.546 | 56.11 | −0.1011 |
| S2 | aspheric | 7.4139 | 0.1000 | | | −21.4112 |
| S3 | aspheric | 7.1478 | 0.2400 | 1.656 | 21.52 | 17.4263 |
| S4 | aspheric | 4.1912 | 0.1000 | | | −58.8254 |
| S5 | aspheric | 2.7605 | 0.2186 | 1.656 | 21.52 | −8.5667 |
| S6 | aspheric | 3.2219 | 0.1000 | | | −15.4378 |
| S7 | aspheric | 2.8996 | 0.2196 | 1.656 | 21.52 | −90.6424 |
| S8 | aspheric | 2.9822 | 0.1036 | | | −26.2875 |
| S9 | aspheric | −4.1673 | 0.8492 | 1.546 | 56.11 | −99.0000 |
| S10 | aspheric | −0.9723 | 0.1000 | | | −2.8240 |

TABLE 4-continued

| surface number | surface type | radius of curvature | thickness | material refractive index | abbe number | conic coefficient |
|---|---|---|---|---|---|---|
| S11 | aspheric | 4.6386 | 0.2800 | 1.656 | 21.52 | −99.0000 |
| S12 | aspheric | 2.7593 | 0.1384 | | | −38.9419 |
| S13 | aspheric | 2.9386 | 0.3026 | 1.546 | 56.11 | 0.6012 |
| S14 | aspheric | 0.9066 | 0.5890 | | | −5.2557 |
| S15 | spherical | infinite | 0.2100 | 1.517 | 64.17 | |
| S16 | spherical | infinite | 0.1859 | | | |
| S17 | spherical | infinite | | | | |

TABLE 5

| surface number | A4 | A6 | A8 | A10 | A12 |
|---|---|---|---|---|---|
| S1 | −3.7326E−02 | 2.1540E−01 | −1.8775E+00 | 7.9968E+00 | −1.9318E+01 |
| S2 | −9.9108E−02 | −1.4281E−01 | 1.8532E−01 | −1.0134E+00 | 2.1713E+00 |
| S3 | −9.2718E−02 | −2.8319E−02 | −1.3710E−01 | −3.7457E−02 | −1.4515E−01 |
| S4 | −5.8507E−03 | −5.7444E−02 | −4.2168E−02 | 2.1844E−01 | −1.0453E+00 |
| S5 | −1.0157E−01 | 4.7620E−01 | −3.2138E+00 | 9.2605E+00 | −1.5249E+01 |
| S6 | −5.5654E−02 | 3.4140E−01 | −1.4706E+00 | 2.7654E+00 | −3.0623E+00 |
| S7 | 1.4569E−01 | −1.6041E+00 | 4.9344E+00 | −9.2877E+00 | 1.0640E+01 |
| S8 | 9.1686E−02 | −7.8911E−01 | 1.8517E+00 | −2.6904E+00 | 2.4320E+00 |
| S9 | 5.5382E−02 | 8.3493E−02 | −4.2422E−01 | 7.2717E−01 | −6.0371E−01 |
| S10 | −2.2446E−02 | −2.7559E−01 | 7.1916E−01 | −9.7682E−01 | 7.6854E−01 |
| S11 | 2.4875E−01 | −9.0372E−01 | 1.1181E+00 | −6.6717E−01 | −5.2515E−02 |
| S12 | 4.9069E−01 | −1.3698E+00 | 1.8235E+00 | −1.5751E+00 | 8.9285E−01 |
| S13 | −2.5885E−01 | 1.3795E−01 | −1.5528E−01 | 1.5480E−01 | −8.5950E−02 |
| S14 | −2.2137E−01 | 1.9908E−01 | −1.3620E−01 | 7.0771E−02 | −2.5933E−02 |

| surface number | A14 | A16 | A18 | A20 |
|---|---|---|---|---|
| S1 | 2.4208E+01 | −1.2350E+01 | 0.0000E+00 | 0.0000E+00 |
| S2 | −2.4120E+00 | 1.1649E+00 | 0.0000E+00 | 0.0000E+00 |
| S3 | 3.2261E−01 | −7.3662E−02 | 0.0000E+00 | 0.0000E+00 |
| S4 | 1.2746E+00 | −4.6402E−01 | 0.0000E+00 | 0.0000E+00 |
| S5 | 1.2958E+01 | −4.2871E+00 | 0.0000E+00 | 0.0000E+00 |
| S6 | 1.9044E+00 | −4.8259E−01 | 0.0000E+00 | 0.0000E+00 |
| S7 | −6.6443E+00 | 1.7090E+00 | 0.0000E+00 | 0.0000E+00 |
| S8 | −1.2178E+00 | 2.5375E−01 | 0.0000E+00 | 0.0000E+00 |
| S9 | 2.4857E−01 | −4.1924E−02 | 0.0000E+00 | 0.0000E+00 |
| S10 | −3.0553E−01 | 4.7168E−02 | 0.0000E+00 | 0.0000E+00 |
| S11 | 3.4829E−01 | −2.2013E−01 | 6.0151E−02 | −6.2835E−03 |
| S12 | −3.2409E−01 | 7.1985E−02 | −8.8715E−03 | 4.6346E−04 |
| S13 | 2.7219E−02 | −4.9685E−03 | 4.8921E−04 | −2.0205E−05 |
| S14 | 6.2114E−03 | −9.1055E−04 | 7.3662E−05 | −2.5106E−06 |

TABLE 6

| | |
|---|---|
| ImgH(mm) | 3.05 |
| HFOV(°) | 46.28/46.3 |
| f(mm) | 3.01 |
| f1(mm) | 4.60 |
| f2(mm) | −15.95 |
| f3(mm) | 24.72 |
| f4(mm) | 77.69 |
| f5(mm) | 2.12 |
| f6(mm) | −11.03 |
| f7(mm) | −2.53 |
| TTL(mm) | 4.29 |

FIG. 4A shows a longitudinal aberration curve of the camera lens assembly according to Embodiment 2, representing deviations of focal points of light of different wavelengths converged after passing through a camera lens assembly. FIG. 4B shows an astigmatic curve of the camera lens assembly according to Embodiment 2, representing a curvature of a tangential image plane and a curvature of a sagittal image plane. FIG. 4C shows a distortion curve of the camera lens assembly according to Embodiment 2, representing amounts of distortion at different viewing angles. It can be seen from FIG. 4A to FIG. 4C that the camera lens assembly according to Embodiment 2 can achieve good imaging quality.

Embodiment 3

The camera lens assembly according to Embodiment 3 of the present disclosure is described below with reference to FIG. 5 to FIG. 6C.

Figure 5:
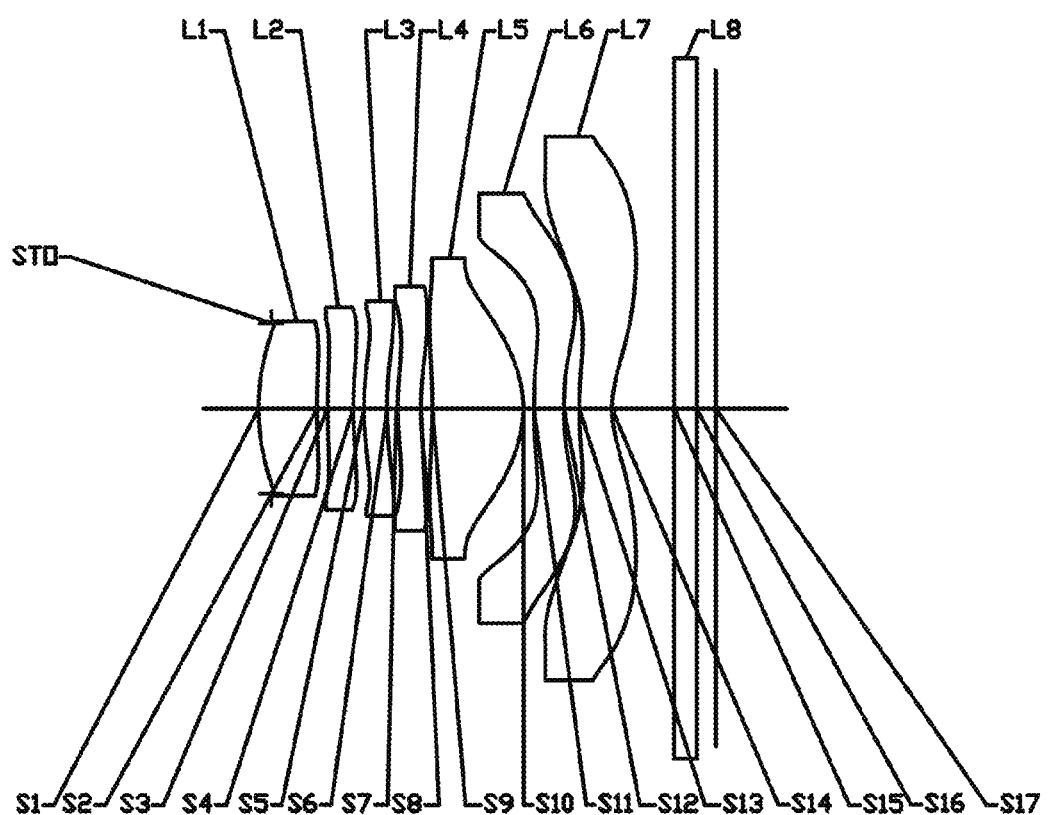
FIG. 5 is a schematic structural diagram illustrating a camera lens assembly according to Embodiment 3 of the present disclosure.

FIG. 5 illustrates a schematic structural diagram of the camera lens assembly according to Embodiment 3 of the present disclosure. As shown in FIG. 5, the camera lens assembly according to Embodiment 3 includes the first to seventh lenses L1 to L7 each having an object-side surface and an image-side surface. Table 7 shows the surface type, the radius of curvature, the thickness, the material and the conic coefficient of each lens of the camera lens assembly in Embodiment 3. Table 8 shows higher-order coefficients of each aspheric mirror surface in Embodiment 3. Table 9 shows the effective focal lengths f1 to f7 of the lenses, the total effective focal length f of the imaging lens assembly of the camera lens assembly, the half of the diagonal length ImgH of the effective pixel area of the electronic photosensitive element of the camera lens assembly, the half of the maximal field-of-view HFOV of the camera lens assembly, and the distance TTL from the object-side surface S1 of the first lens L1 to the image plane S17 of the camera lens assembly on the optical axis in Embodiment 3. Here, each aspheric surface type may be defined by the formula (1) given in the above Embodiment 1.

TABLE 7

| surface number | surface type | radius of curvature | thickness | refractive index (material) | abbe number (material) | conic coefficient |
|---|---|---|---|---|---|---|
| OBJ | spherical | infinite | infinite | | | |
| STO | spherical | infinite | −0.1205 | | | |
| S1 | aspheric | 1.8985 | 0.5490 | 1.546 | 56.11 | 0.0099 |
| S2 | aspheric | 6.5658 | 0.1000 | | | 6.1570 |
| S3 | aspheric | 6.6880 | 0.2400 | 1.656 | 21.52 | 23.1426 |
| S4 | aspheric | 4.0631 | 0.1000 | | | −67.8439 |
| S5 | aspheric | 2.9418 | 0.2164 | 1.656 | 21.52 | −5.6052 |
| S6 | aspheric | 3.6143 | 0.0987 | | | −10.0259 |
| S7 | aspheric | 2.5604 | 0.2168 | 1.656 | 21.52 | −67.0530 |
| S8 | aspheric | 2.5444 | 0.1085 | | | −28.9821 |
| S9 | aspheric | −4.7213 | 0.8523 | 1.546 | 56.11 | −82.7557 |
| S10 | aspheric | −0.9987 | 0.1000 | | | −2.7766 |
| S11 | aspheric | 5.7881 | 0.2800 | 1.656 | 21.52 | −98.8780 |
| S12 | aspheric | 3.2167 | 0.1445 | | | −36.7045 |
| S13 | aspheric | 2.9515 | 0.3066 | 1.546 | 56.11 | 0.6148 |
| S14 | aspheric | 0.9136 | 0.5827 | | | −5.3640 |
| S15 | spherical | infinite | 0.2100 | 1.517 | 64.17 | |
| S16 | spherical | infinite | 0.1796 | | | |
| S17 | spherical | infinite | | | | |

TABLE 8

| surface number | A4 | A6 | A8 | A10 | A12 |
|---|---|---|---|---|---|
| S1 | −3.5700E−02 | 1.5025E−01 | −1.0918E+00 | 3.8881E+00 | −8.0402E+00 |
| S2 | −1.1696E−01 | −8.4281E−02 | 2.7029E−01 | −1.0215E+00 | 1.5464E+00 |
| S3 | −1.3432E−01 | −4.0310E−02 | 6.3340E−01 | −2.3595E+00 | 3.6635E+00 |
| S4 | −8.2452E−04 | −2.2971E−01 | 6.3087E−01 | −9.1763E−01 | −3.0825E−02 |
| S5 | −5.8523E−02 | 3.5996E−01 | −3.0321E+00 | 9.1176E+00 | −1.5209E+01 |
| S6 | −5.0598E−02 | 3.8505E−01 | −1.6528E+00 | 3.2031E+00 | −3.7240E+00 |
| S7 | 1.0055E−01 | −1.3893E+00 | 4.1340E+00 | −7.4468E+00 | 8.1680E+00 |
| S8 | 8.2260E−02 | −7.1408E−01 | 1.5991E+00 | −2.2240E+00 | 1.9570E+00 |
| S9 | 5.4850E−02 | 8.4064E−02 | −4.5142E−01 | 8.2674E−01 | −7.3254E−01 |
| S10 | −9.2939E−03 | −3.1807E−01 | 7.7505E−01 | −1.0086E+00 | 7.6487E−01 |
| S11 | 2.6645E−01 | −9.9065E−01 | 1.2848E+00 | −8.3015E−01 | 2.4722E−02 |
| S12 | 5.0169E−01 | −1.4333E+00 | 1.9561E+00 | −1.7173E+00 | 9.8180E−01 |
| S13 | −2.6736E−01 | 1.3906E−01 | −1.5310E−01 | 1.5462E−01 | −8.6893E−02 |
| S14 | −2.2461E−01 | 2.1048E−01 | −1.5857E−01 | 8.9882E−02 | −3.4669E−02 |

| surface number | A14 | A16 | A18 | A20 |
|---|---|---|---|---|
| S1 | 8.7061E+00 | −3.8822E+00 | 0.0000E+00 | 0.0000E+00 |
| S2 | −1.3717E+00 | 6.0451E−01 | 0.0000E+00 | 0.0000E+00 |
| S3 | −3.2249E+00 | 1.2902E+00 | 0.0000E+00 | 0.0000E+00 |
| S4 | 7.8152E−01 | −3.5833E−01 | 0.0000E+00 | 0.0000E+00 |
| S5 | 1.2933E+01 | −4.2585E+00 | 0.0000E+00 | 0.0000E+00 |
| S6 | 2.4415E+00 | −6.5576E−01 | 0.0000E+00 | 0.0000E+00 |
| S7 | −4.8871E+00 | 1.1971E+00 | 0.0000E+00 | 0.0000E+00 |
| S8 | −9.6866E−01 | 2.0063E−01 | 0.0000E+00 | 0.0000E+00 |
| S9 | 3.2145E−01 | −5.7205E−02 | 0.0000E+00 | 0.0000E+00 |
| S10 | −2.9487E−01 | 4.4340E−02 | 0.0000E+00 | 0.0000E+00 |
| S11 | 3.4289E−01 | −2.3120E−01 | 6.4710E−02 | −6.8507E−03 |
| S12 | −3.5796E−01 | 7.9724E−02 | −9.8477E−03 | 5.1573E−04 |
| S13 | 2.7760E−02 | −5.0991E−03 | 5.0429E−04 | −2.0889E−05 |
| S14 | 8.5315E−03 | −1.2706E−03 | 1.0398E−04 | −3.5821E−06 |

TABLE 9

| | |
|---|---|
| ImgH(mm) | 3.05 |
| HFOV(°) | 46.28/46.3 |
| f(mm) | 3.01 |
| f1(mm) | 4.70 |
| f2(mm) | −16.37 |
| f3(mm) | 21.36 |
| f4(mm) | 142.05 |
| f5(mm) | 2.15 |
| f6(mm) | −11.53 |
| f7(mm) | −2.56 |
| TTL(mm) | 4.29 |

Figure 6A:
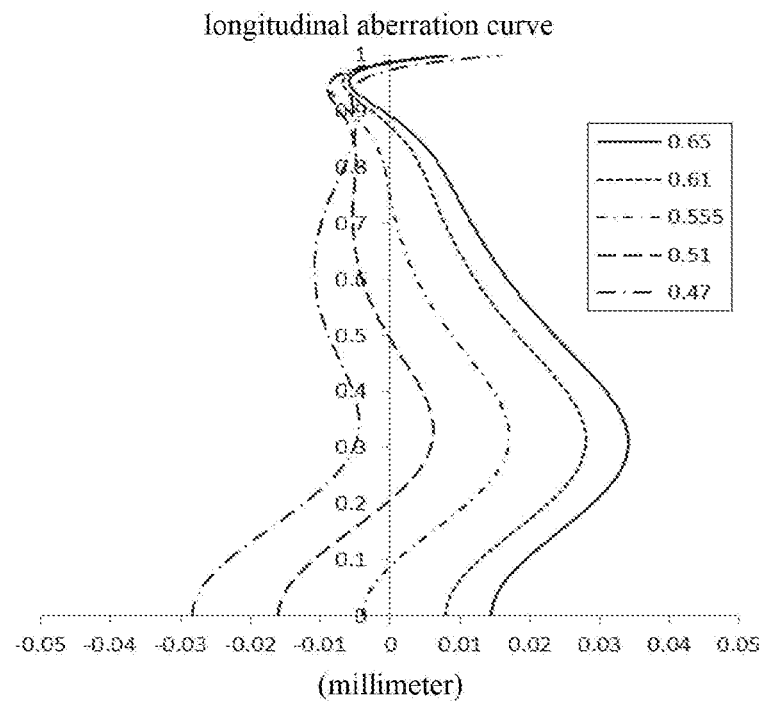
FIG. 6A, FIG. 6B and FIG. 6C illustrate a longitudinal aberration curve, an astigmatic curve and a distortion curve of the camera lens assembly according to Embodiment 3, respectively.
Figures 6B, 6C:
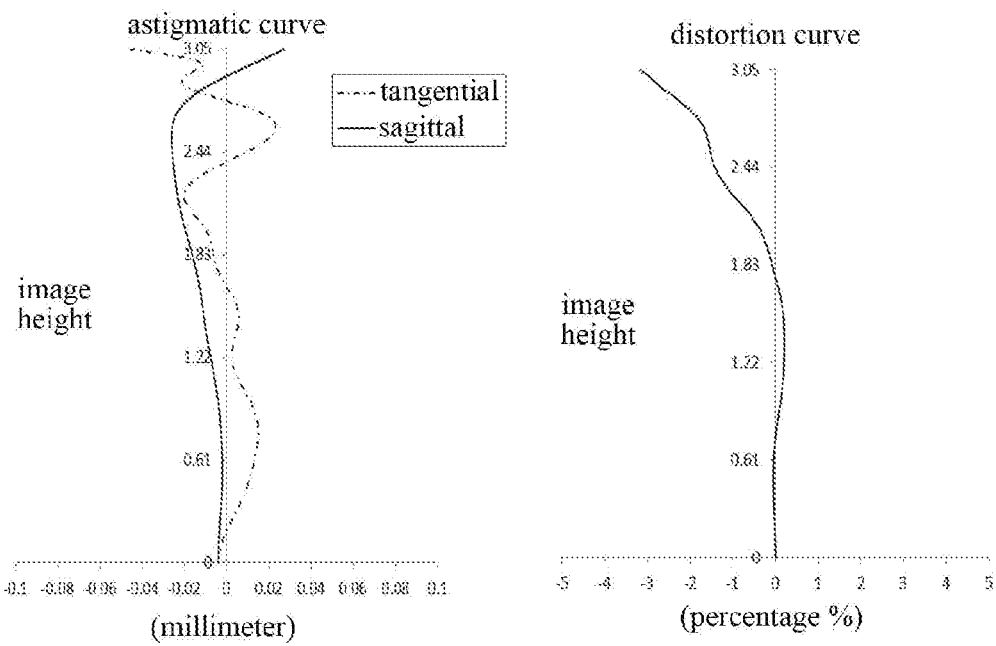

FIG. 6A shows a longitudinal aberration curve of the camera lens assembly according to Embodiment 3, representing deviations of focal points of light of different wavelengths converged after passing through a camera lens assembly. FIG. 6B shows an astigmatic curve of the camera lens assembly according to Embodiment 3, representing a curvature of a tangential image plane and a curvature of a sagittal image plane. FIG. 6C shows a distortion curve of the camera lens assembly according to Embodiment 3, representing amounts of distortion at different viewing angles. It can be seen from FIG. 6A to FIG. 6C that the camera lens assembly according to Embodiment 3 can achieve good imaging quality.

Embodiment 4

The camera lens assembly according to Embodiment 4 of the present disclosure is described below with reference to FIG. 7 to FIG. 8C.

Figure 7:
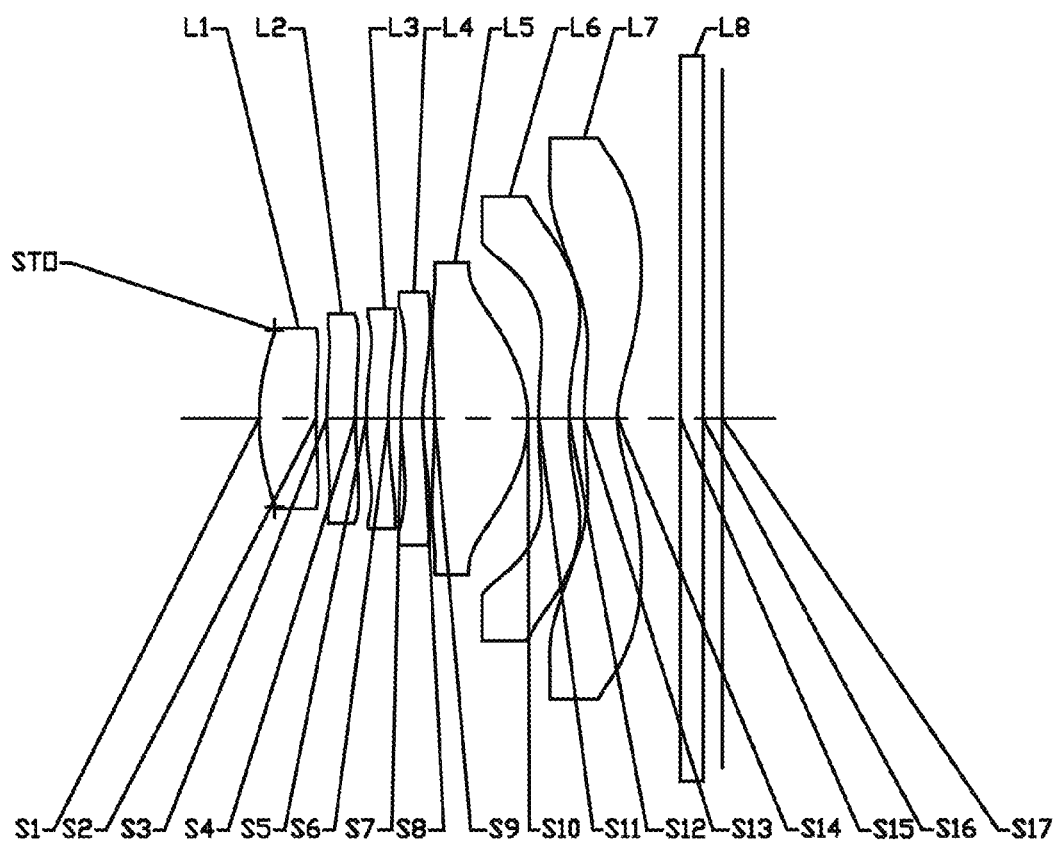
FIG. 7 is a schematic structural diagram illustrating a camera lens assembly according to Embodiment 4 of the present disclosure.

FIG. 7 illustrates a schematic structural diagram of the camera lens assembly according to Embodiment 4 of the present disclosure. As shown in FIG. 7, the camera lens assembly according to Embodiment 4 includes the first to seventh lenses L1 to L7 each having an object-side surface and an image-side surface. Table 10 shows the surface type, the radius of curvature, the thickness, the material and the conic coefficient of each lens of the camera lens assembly in Embodiment 4. Table 11 shows higher-order coefficients of each aspheric mirror surface in Embodiment 4. Table 12 shows the effective focal lengths f1 to f7 of the lenses, the total effective focal length f of the imaging lens assembly of the camera lens assembly, the half of the diagonal length ImgH of the effective pixel area of the electronic photosensitive element of the camera lens assembly, the half of the maximal field-of-view HFOV of the camera lens assembly, and the distance TTL from the object-side surface S1 of the first lens L1 to the image plane S17 of the camera lens assembly on the optical axis in Embodiment 4. Here, each aspheric surface type may be defined by the formula (1) given in the above Embodiment 1.

TABLE 10

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.1397 | | | |
| S1 | aspheric | 1.8995 | 0.5256 | 1.546 | 56.11 | −0.0757 |
| S2 | aspheric | 4.6065 | 0.1000 | | | 4.0349 |
| S3 | aspheric | 4.7154 | 0.2656 | 1.656 | 21.52 | 20.2446 |
| S4 | aspheric | 4.6314 | 0.1002 | | | −61.9603 |
| S5 | aspheric | 3.1919 | 0.2046 | 1.656 | 21.52 | −6.2664 |
| S6 | aspheric | 3.5410 | 0.1187 | | | −10.2326 |
| S7 | aspheric | 2.2890 | 0.1997 | 1.656 | 21.52 | −61.7955 |
| S8 | aspheric | 2.2101 | 0.1096 | | | −29.0475 |
| S9 | aspheric | −5.4167 | 0.8626 | 1.546 | 56.11 | −96.1028 |
| S10 | aspheric | −1.0227 | 0.1000 | | | −2.7733 |
| S11 | aspheric | 6.7660 | 0.2800 | 1.656 | 21.52 | −98.8718 |
| S12 | aspheric | 3.6798 | 0.1403 | | | −35.2090 |
| S13 | aspheric | 2.9527 | 0.3087 | 1.546 | 56.11 | 0.6136 |
| S14 | aspheric | 0.9020 | 0.5812 | | | −5.4347 |
| S15 | spherical | infinite | 0.2100 | 1.517 | 64.17 | |
| S16 | spherical | infinite | 0.1781 | | | |
| S17 | spherical | infinite | | | | |

TABLE 11

| surface number | A4 | A6 | A8 | A10 | A12 |
|---|---|---|---|---|---|
| S1 | −3.1951E−02 | 7.0360E−02 | −6.1751E−01 | 2.2761E+00 | −4.8979E+00 |
| S2 | −1.1230E−01 | −1.3511E−01 | 3.4853E−01 | −1.0567E+00 | 1.4132E+00 |
| S3 | −9.6998E−02 | −2.5587E−01 | 1.2941E+00 | −3.9711E+00 | 6.2170E+00 |
| S4 | 7.6922E−03 | −2.4471E−01 | 5.4563E−01 | −5.4716E−01 | −5.1302E−01 |
| S5 | −3.8167E−02 | 3.0581E−01 | −3.1143E+00 | 9.5045E+00 | −1.5610E+01 |
| S6 | −5.7645E−02 | 5.1123E−01 | −2.2613E+00 | 4.5236E+00 | −5.2100E+00 |
| S7 | 9.7132E−02 | −1.3635E+00 | 4.1000E+00 | −7.4524E+00 | 8.1703E+00 |
| S8 | 8.6566E−02 | −7.6419E−01 | 1.8195E+00 | −2.6563E+00 | 2.3942E+00 |
| S9 | 5.6548E−02 | 7.3963E−02 | −3.9486E−01 | 7.0512E−01 | −6.0502E−01 |
| S10 | −1.1315E−02 | −2.9017E−01 | 7.1098E−01 | −9.3801E−01 | 7.1649E−01 |
| S11 | 2.5869E−01 | −9.4933E−01 | 1.1374E+00 | −5.5769E−01 | −2.7174E−01 |
| S12 | 5.1061E−01 | −1.4550E+00 | 1.9680E+00 | −1.7031E+00 | 9.5936E−01 |
| S13 | −2.6736E−01 | 1.3949E−01 | −1.5414E−01 | 1.5576E−01 | −8.7487E−02 |

TABLE 11-continued

| S14 | −2.3379E−01 | 2.3266E−01 | −1.8215E−01 | 1.0341E−01 | −3.9337E−02 |

| surface number | A14 | A16 | A18 | A20 |
|---|---|---|---|---|
| S1 | 5.4278E+00 | −2.4542E+00 | 0.0000E+00 | 0.0000E+00 |
| S2 | −1.0550E+00 | 4.2782E−01 | 0.0000E+00 | 0.0000E+00 |
| S3 | −5.3828E+00 | 2.0231E+00 | 0.0000E+00 | 0.0000E+00 |
| S4 | 1.0349E+00 | −4.0270E−01 | 0.0000E+00 | 0.0000E+00 |
| S5 | 1.3030E+01 | −4.2274E+00 | 0.0000E+00 | 0.0000E+00 |
| S6 | 3.2869E+00 | −8.4741E−01 | 0.0000E+00 | 0.0000E+00 |
| S7 | −4.8503E+00 | 1.1754E+00 | 0.0000E+00 | 0.0000E+00 |
| S8 | −1.1902E+00 | 2.4487E−01 | 0.0000E+00 | 0.0000E+00 |
| S9 | 2.5480E−01 | −4.3376E−02 | 0.0000E+00 | 0.0000E+00 |
| S10 | −2.7603E−01 | 4.1303E−02 | 0.0000E+00 | 0.0000E+00 |
| S11 | 5.4097E−01 | −3.1093E−01 | 8.2410E−02 | −8.5105E−03 |
| S12 | −3.4509E−01 | 7.5924E−02 | −9.2725E−03 | 4.8040E−04 |
| S13 | 2.7930E−02 | −5.1273E−03 | 5.0690E−04 | −2.0997E−05 |
| S14 | 9.5405E−03 | −1.4053E−03 | 1.1421E−04 | −3.9200E−06 |

TABLE 12

| ImgH(mm) | 3.05 |
|---|---|
| HFOV(°) | 46.28/46.3 |
| f(mm) | 3.02 |
| f1(mm) | 5.54 |
| f2(mm) | 1569.10 |
| f3(mm) | 40.03 |
| f4(mm) | 27552.97 |
| f5(mm) | 2.16 |
| f6(mm) | −12.75 |
| f7(mm) | −2.54 |
| TTL(mm) | 4.29 |

Figure 8A:
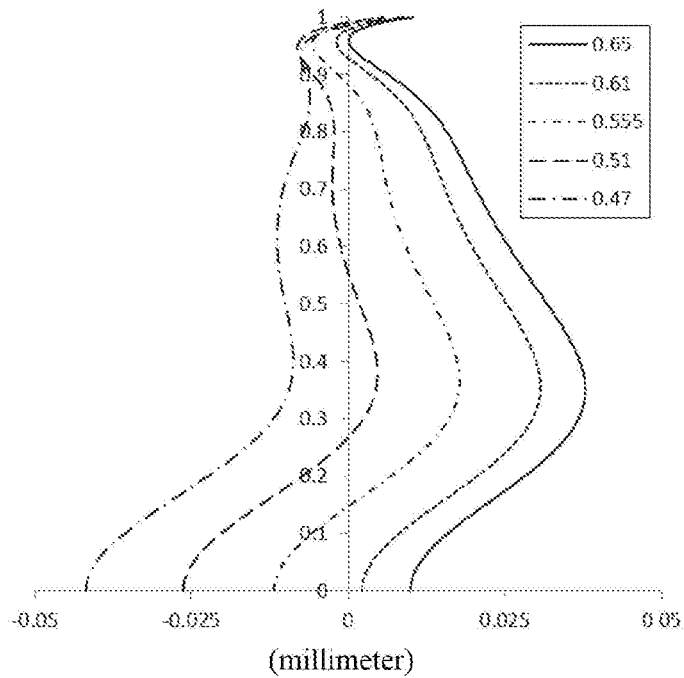
FIG. 8A, FIG. 8B and FIG. 8C illustrate a longitudinal aberration curve, an astigmatic curve and a distortion curve of the camera lens assembly according to Embodiment 4, respectively.
Figure 8B:
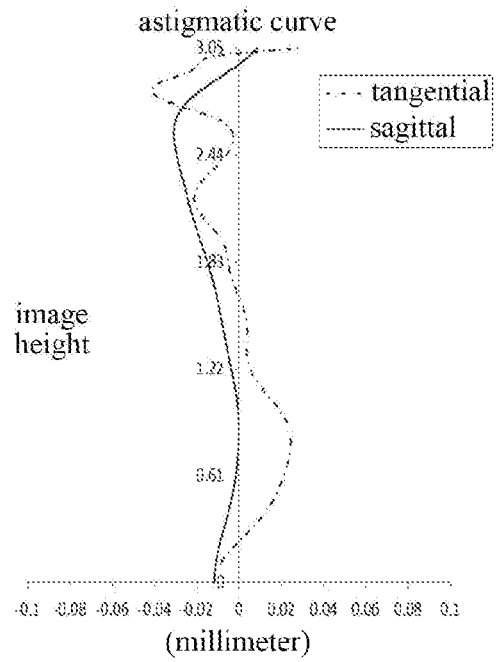
Figure 8C:
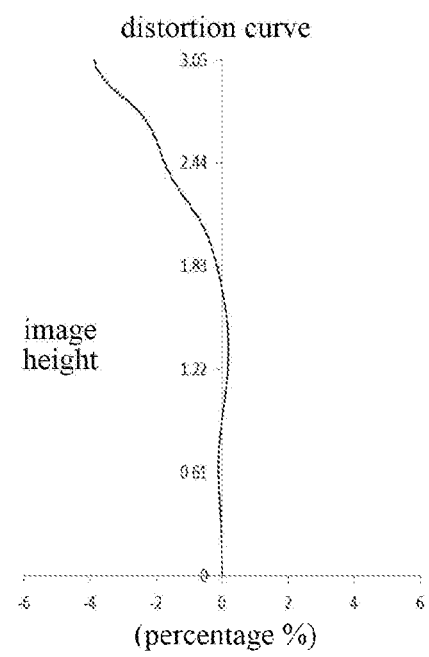

FIG. 8A shows a longitudinal aberration curve of the camera lens assembly according to Embodiment 4, representing deviations of focal points of light of different wavelengths converged after passing through a camera lens assembly. FIG. 8B shows an astigmatic curve of the camera lens assembly according to Embodiment 4, representing a curvature of a tangential image plane and a curvature of a sagittal image plane. FIG. 8C shows a distortion curve of the camera lens assembly according to Embodiment 4, representing amounts of distortion at different viewing angles. It can be seen from FIG. 8A to FIG. 8C that the camera lens assembly according to Embodiment 4 can achieve good imaging quality.

Embodiment 5

The camera lens assembly according to Embodiment 5 of the present disclosure is described below with reference to FIG. 9 to FIG. 10C.

Figure 9:
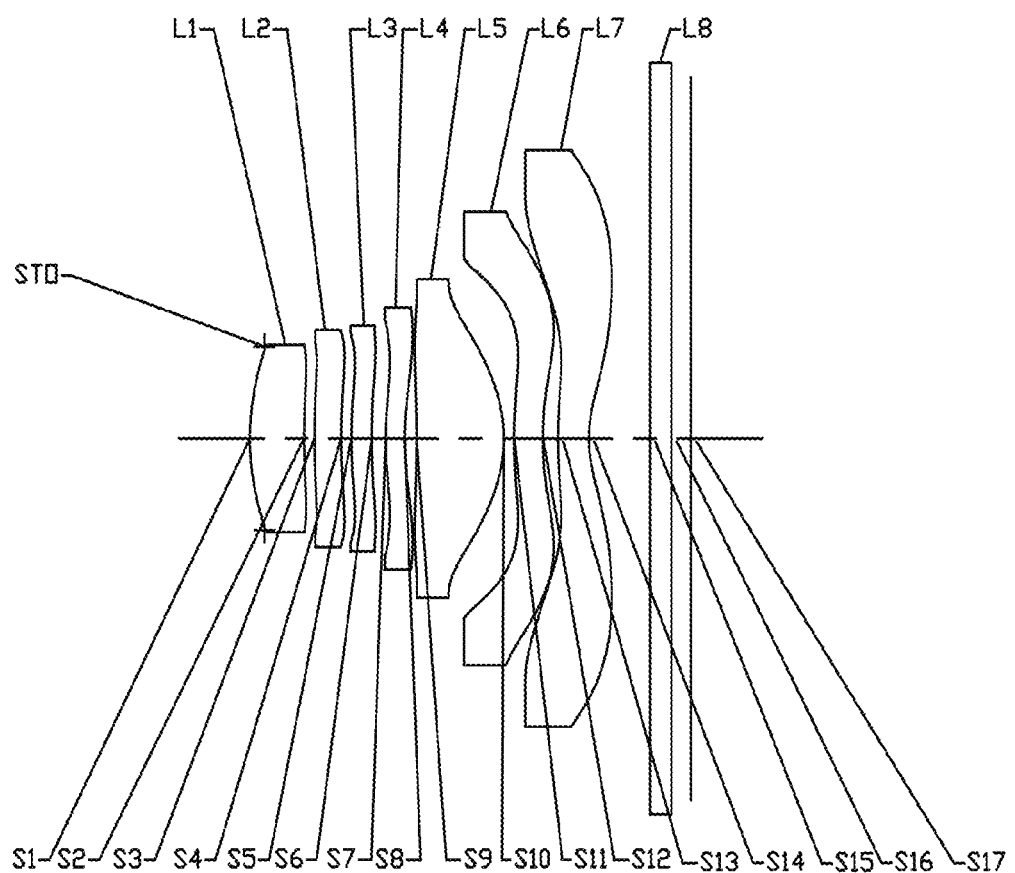
FIG. 9 is a schematic structural diagram illustrating a camera lens assembly according to Embodiment 5 of the present disclosure.

FIG. 9 illustrates a schematic structural diagram of the camera lens assembly according to Embodiment 5 of the present disclosure. As shown in FIG. 9, the camera lens assembly according to Embodiment 5 includes the first to seventh lenses L1 to L7 each having an object-side surface and an image-side surface. Table 13 shows the surface type, the radius of curvature, the thickness, the material and the conic coefficient of each lens of the camera lens assembly in Embodiment 5. Table 14 shows the higher-order coefficients of each aspheric mirror surface in Embodiment 5. Table 15 shows the effective focal lengths f1 to f7 of the lenses, the total effective focal length f of the imaging lens assembly of the camera lens assembly, the half of the diagonal length ImgH of the effective pixel area of the electronic photosensitive element of the camera lens assembly, the half of the maximal field-of-view HFOV of the camera lens assembly, and the distance TTL from the object-side surface S1 of the first lens L1 to the image plane S17 of the camera lens assembly on the optical axis in Embodiment 5. Here, each aspheric surface type may be defined by the formula (1) given in the above Embodiment 1.

TABLE 13

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.1417 | | | |
| S1 | aspheric | 1.9044 | 0.5263 | 1.546 | 56.11 | −0.0283 |
| S2 | aspheric | 4.7194 | 0.1000 | | | 5.9944 |
| S3 | aspheric | 4.8551 | 0.2613 | 1.656 | 21.52 | 21.4988 |
| S4 | aspheric | 4.7573 | 0.1000 | | | −55.0065 |
| S5 | aspheric | 4.1831 | 0.1960 | 1.656 | 21.52 | −6.6359 |
| S6 | aspheric | 4.9771 | 0.1352 | | | −17.1260 |
| S7 | aspheric | 2.1700 | 0.1842 | 1.656 | 21.52 | −49.5768 |
| S8 | aspheric | 1.9750 | 0.1178 | | | −25.9076 |
| S9 | aspheric | −6.4808 | 0.8478 | 1.546 | 56.11 | −87.3040 |
| S10 | aspheric | −1.0528 | 0.1000 | | | −2.8048 |
| S11 | aspheric | 5.1911 | 0.2800 | 1.656 | 21.52 | −99.0000 |
| S12 | aspheric | 3.3372 | 0.1436 | | | −33.5072 |
| S13 | aspheric | 2.9536 | 0.3015 | 1.546 | 56.11 | 0.6143 |
| S14 | aspheric | 0.9060 | 0.5922 | | | −5.3762 |
| S15 | spherical | infinite | 0.2100 | 1.517 | 64.17 | |

TABLE 13-continued

| surface number | surface type | radius of curvature | thickness | material refractive index | abbe number | conic coefficient |
|---|---|---|---|---|---|---|
| S16 | spherical | infinite | 0.1891 | | | |
| S17 | spherical | infinite | | | | |

TABLE 14

| surface number | A4 | A6 | A8 | A10 | A12 |
|---|---|---|---|---|---|
| S1 | −4.3543E−02 | 2.3883E−01 | −1.7550E+00 | 6.5969E+00 | −1.3981E+01 |
| S2 | −1.2556E−01 | −1.1085E−02 | −3.0150E−01 | 1.2394E+00 | −3.1078E+00 |
| S3 | −1.2293E−01 | −1.4793E−01 | 9.7410E−01 | −3.2627E+00 | 5.3088E+00 |
| S4 | 1.4524E−02 | −3.2293E−02 | 9.1377E−01 | −1.3165E+00 | 2.8371E−01 |
| S5 | −2.6696E−02 | 2.8285E−01 | −3.3940E+00 | 1.0938E+01 | −1.8418E+01 |
| S6 | −4.3099E−02 | 4.3066E−01 | −2.2806E+00 | 5.0136E+00 | −6.1684E+00 |
| S7 | 8.1381E−02 | −1.1156E+00 | 3.1781E+00 | −5.6183E+00 | 6.0758E+00 |
| S8 | 7.5020E−02 | −6.4177E−01 | 1.4463E+00 | −2.0432E+00 | 1.8226E+00 |
| S9 | 5.5970E−02 | 5.9903E−02 | −3.5244E−01 | 6.3702E−01 | −5.4662E−01 |
| S10 | −1.7850E−02 | −2.4705E−01 | 5.9413E−01 | −7.6212E−01 | 5.7310E−01 |
| S11 | 2.6631E−01 | −9.7731E−01 | 1.1987E+00 | −6.4865E−01 | −1.7937E−01 |
| S12 | 5.1286E−01 | −1.4794E+00 | 2.0266E+00 | −1.7754E+00 | 1.0108E+00 |
| S13 | −2.6787E−01 | 1.4277E−01 | −1.5943E−01 | 1.6076E−01 | −9.0353E−02 |
| S14 | −2.3141E−01 | 2.2748E−01 | −1.7700E−01 | 1.0086E−01 | −3.8651E−02 |

| surface number | A14 | A16 | A18 | A20 |
|---|---|---|---|---|
| S1 | 1.5356E+01 | −6.8453E+00 | 0.0000E+00 | 0.0000E+00 |
| S2 | 3.4981E+00 | −1.4104E+00 | 0.0000E+00 | 0.0000E+00 |
| S3 | −4.8034E+00 | 1.8846E+00 | 0.0000E+00 | 0.0000E+00 |
| S4 | 6.3050E−01 | −3.2224E−01 | 0.0000E+00 | 0.0000E+00 |
| S5 | 1.5537E+01 | −5.0720E+00 | 0.0000E+00 | 0.0000E+00 |
| S6 | 4.0793E+00 | −1.0918E+00 | 0.0000E+00 | 0.0000E+00 |
| S7 | −3.5734E+00 | 8.6015E−01 | 0.0000E+00 | 0.0000E+00 |
| S8 | −9.0842E−01 | 1.8819E−01 | 0.0000E+00 | 0.0000E+00 |
| S9 | 2.2842E−01 | −3.8232E−02 | 0.0000E+00 | 0.0000E+00 |
| S10 | −2.1786E−01 | 3.2146E−02 | 0.0000E+00 | 0.0000E+00 |
| S11 | 4.7867E−01 | −2.8474E−01 | 7.6303E−02 | −7.9143E−03 |
| S12 | −3.6709E−01 | 8.1517E−02 | −1.0051E−02 | 5.2608E−04 |
| S13 | 2.8916E−02 | −5.3256E−03 | 5.2838E−04 | −2.1964E−05 |
| S14 | 9.4414E−03 | −1.3990E−03 | 1.1423E−04 | −3.9346E−06 |

TABLE 15

| | |
|---|---|
| ImgH(mm) | 3.05 |
| HFOV(°) | 46.2 |
| f(mm) | 3.03 |
| f1(mm) | 5.49 |
| f2(mm) | 6124.95 |
| f3(mm) | 36.39 |
| f4(mm) | −53.55 |
| f5(mm) | 2.18 |
| f6(mm) | −15.14 |
| f7(mm) | −2.53 |
| TTL(mm) | 4.29 |

Figure 10A:
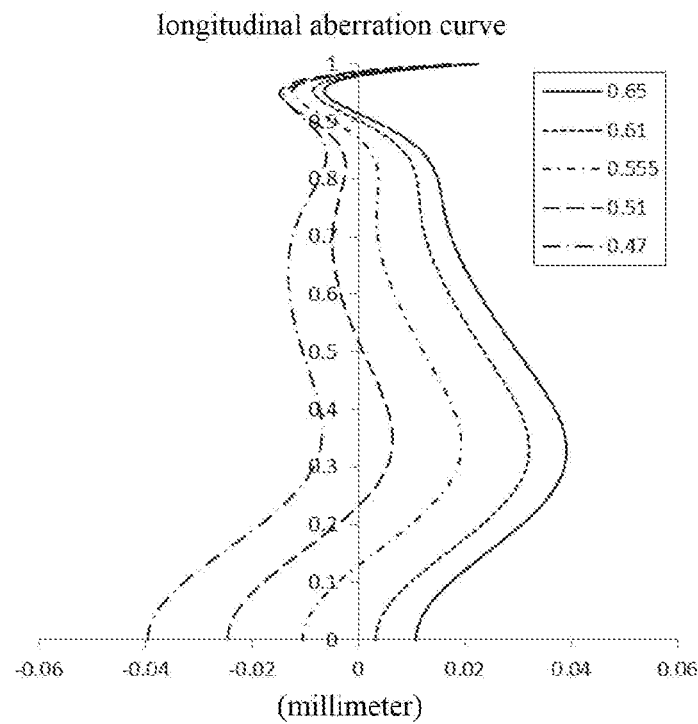
FIG. 10A, FIG. 10B and FIG. 10C illustrate a longitudinal aberration curve, an astigmatic curve and a distortion curve of the camera lens assembly according to Embodiment 5, respectively.
Figures 10B, 10C:
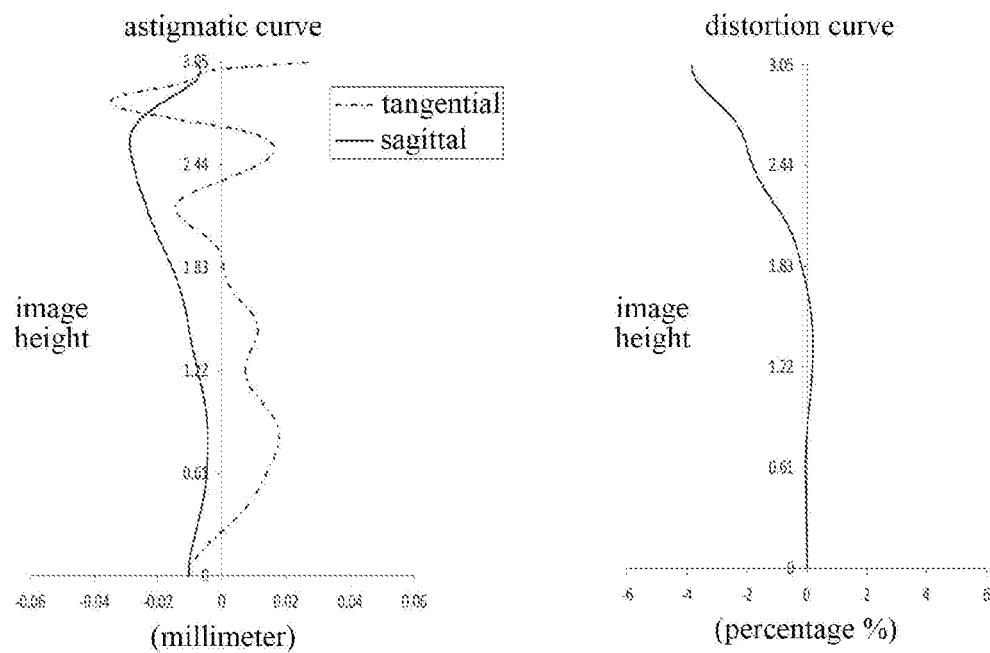

FIG. 10A shows a longitudinal aberration curve of the camera lens assembly according to Embodiment 5, representing deviations of focal points of light of different wavelengths converged after passing through a camera lens assembly. FIG. 10B shows an astigmatic curve of the camera lens assembly according to Embodiment 5, representing a curvature of a tangential image plane and a curvature of a sagittal image plane. FIG. 10C shows a distortion curve of the camera lens assembly according to Embodiment 5, representing amounts of distortion at different viewing angles. It can be seen from FIG. 10A to FIG. 10C that the camera lens assembly according to Embodiment 5 can achieve good imaging quality.

Embodiment 6

The camera lens assembly according to Embodiment 6 of the present disclosure is described below with reference to FIG. 11 to FIG. 12C.

Figure 11:
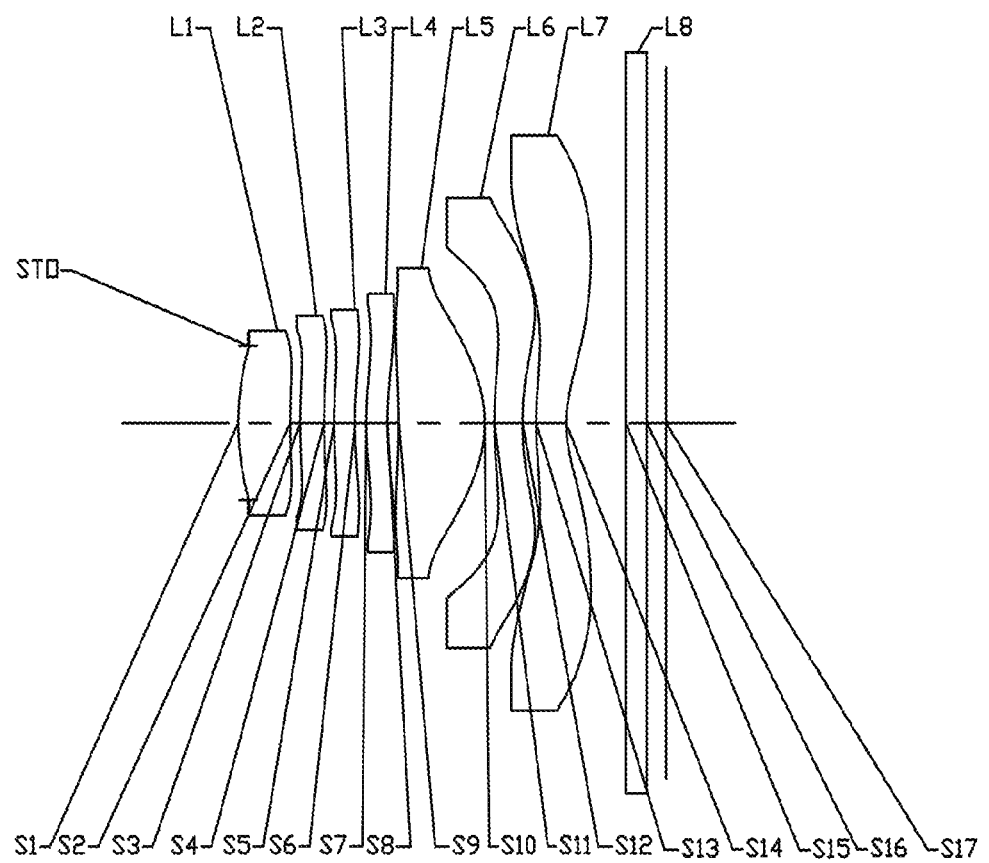
FIG. 11 is a schematic structural diagram illustrating a camera lens assembly according to Embodiment 6 of the present disclosure.

FIG. 11 illustrates a schematic structural diagram of the camera lens assembly according to Embodiment 6 of the present disclosure. As shown in FIG. 11, the camera lens assembly according to Embodiment 6 includes the first to seventh lenses L1 to L7 each having an object-side surface and an image-side surface. Table 16 shows the surface type, the radius of curvature, the thickness, the material and the conic coefficient of each lens of the camera lens assembly in Embodiment 6. Table 17 shows higher-order coefficients of each aspheric mirror surface in Embodiment 6. Table 18 shows the effective focal lengths f1 to f7 of the lenses, the total effective focal length f of the imaging lens assembly of the camera lens assembly, the half of the diagonal length ImgH of the effective pixel area of the electronic photosensitive element of the camera lens assembly, the half of the maximal field-of-view HFOV of the camera lens assembly, and the distance TTL from the object-side surface S1 of the first lens L1 to the image plane S17 of the camera lens assembly on the optical axis in Embodiment 6. Here, each aspheric surface type may be defined by the formula (1) given in the above Embodiment 1.

TABLE 16

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.0990 | | | |
| S1 | aspheric | 1.9436 | 0.5211 | 1.546 | 56.11 | −0.2379 |
| S2 | aspheric | 5.9618 | 0.1001 | | | −99.0000 |
| S3 | aspheric | 5.6189 | 0.2400 | 1.656 | 21.52 | −16.9263 |
| S4 | aspheric | 5.6963 | 0.1000 | | | −52.5609 |
| S5 | aspheric | 4.1503 | 0.2087 | 1.656 | 21.52 | −20.0820 |
| S6 | aspheric | 3.2860 | 0.1138 | | | −38.2002 |
| S7 | aspheric | 2.6638 | 0.2123 | 1.656 | 21.52 | −50.3252 |
| S8 | aspheric | 3.0874 | 0.1118 | | | −18.0138 |
| S9 | aspheric | −4.4640 | 0.8607 | 1.546 | 56.11 | −99.0000 |
| S10 | aspheric | −0.9424 | 0.1000 | | | −2.9250 |
| S11 | aspheric | 4.4719 | 0.2800 | 1.656 | 21.52 | −98.7973 |
| S12 | aspheric | 2.4389 | 0.1370 | | | −38.8404 |
| S13 | aspheric | 2.9281 | 0.2999 | 1.546 | 56.11 | 0.5876 |
| S14 | aspheric | 0.9060 | 0.5963 | | | −4.9282 |
| S15 | spherical | infinite | 0.2100 | 1.517 | 64.17 | |
| S16 | spherical | infinite | 0.1932 | | | |
| S17 | spherical | infinite | | | | |

TABLE 17

| surface number | A4 | A6 | A8 | A10 | A12 |
|---|---|---|---|---|---|
| S1 | −3.8047E−02 | 2.4689E−01 | −2.4118E+00 | 1.1730E+01 | −3.2966E+01 |
| S2 | −3.8343E−02 | −4.5690E−01 | 6.8180E−01 | −1.6295E+00 | 2.4159E+00 |
| S3 | −2.0473E−02 | −3.0932E−01 | −2.3212E−01 | 1.5802E+00 | −4.5064E+00 |
| S4 | 4.2792E−02 | −2.7060E−01 | 3.0686E−01 | −2.9303E−01 | −2.1465E−01 |
| S5 | −1.4369E−01 | 4.3012E−01 | −3.1063E+00 | 9.3161E+00 | −1.5265E+01 |
| S6 | −7.3632E−02 | 3.4672E−01 | −1.6897E+00 | 3.5981E+00 | −4.2243E+00 |
| S7 | 7.6659E−02 | −8.0068E−01 | 2.0848E+00 | −3.4478E+00 | 3.5481E+00 |
| S8 | 4.8795E−02 | −4.6245E−01 | 9.6168E−01 | −1.2920E+00 | 1.1109E+00 |
| S9 | 3.9449E−02 | 1.6285E−01 | −5.5638E−01 | 7.9460E−01 | −5.7056E−01 |
| S10 | −2.2654E−02 | −2.5703E−01 | 6.8752E−01 | −9.4777E−01 | 7.4975E−01 |
| S11 | 2.1990E−01 | −7.4353E−01 | 7.7467E−01 | −2.6405E−01 | −3.4139E−01 |
| S12 | 4.7151E−01 | −1.2342E+00 | 1.5530E+00 | −1.2882E+00 | 7.1232E−01 |
| S13 | −2.4008E−01 | 1.3350E−01 | −1.5724E−01 | 1.5359E−01 | −8.3399E−02 |
| S14 | −2.1789E−01 | 1.8527E−01 | −1.1557E−01 | 5.5327E−02 | −1.9431E−02 |

| surface number | A14 | A16 | A18 | A20 |
|---|---|---|---|---|
| S1 | 4.8574E+01 | −2.9293E+01 | 0.0000E+00 | 0.0000E+00 |
| S2 | −2.0165E+00 | 9.5396E−01 | 0.0000E+00 | 0.0000E+00 |
| S3 | 5.9995E+00 | −2.7822E+00 | 0.0000E+00 | 0.0000E+00 |
| S4 | 5.4694E−01 | −2.3529E−01 | 0.0000E+00 | 0.0000E+00 |
| S5 | 1.2848E+01 | −4.2473E+00 | 0.0000E+00 | 0.0000E+00 |
| S6 | 2.6018E+00 | −6.2987E−01 | 0.0000E+00 | 0.0000E+00 |
| S7 | −2.0246E+00 | 4.8519E−01 | 0.0000E+00 | 0.0000E+00 |
| S8 | −5.3105E−01 | 1.0605E−01 | 0.0000E+00 | 0.0000E+00 |
| S9 | 2.0279E−01 | −2.9029E−02 | 0.0000E+00 | 0.0000E+00 |
| S10 | −2.9997E−01 | 4.6837E−02 | 0.0000E+00 | 0.0000E+00 |
| S11 | 4.8180E−01 | −2.6046E−01 | 6.7560E−02 | −6.9091E−03 |
| S12 | −2.5448E−01 | 5.5812E−02 | −6.7931E−03 | 3.5006E−04 |
| S13 | 2.5945E−02 | −4.6701E−03 | 4.5485E−04 | −1.8630E−05 |
| S14 | 4.5962E−03 | −6.7495E−04 | 5.4992E−05 | −1.8907E−06 |

TABLE 18

| | |
|---|---|
| ImgH(mm) | 3.05 |
| HFOV(°) | 46.09/46.1 |
| f(mm) | 3.00 |
| f1(mm) | 5.05 |
| f2(mm) | 282.76 |
| f3(mm) | −26.58 |
| f4(mm) | 24.68 |
| f5(mm) | 2.01 |
| f6(mm) | −8.64 |
| f7(mm) | −2.54 |
| TTL(mm) | 4.29 |

Figure 12A:
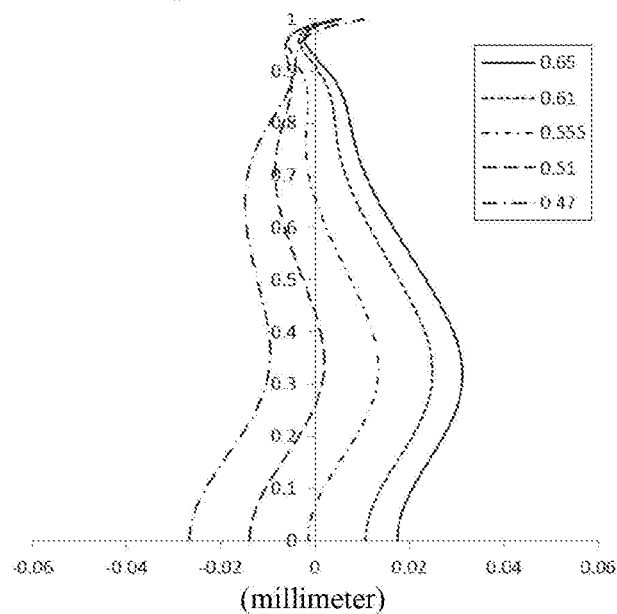
FIG. 12A, FIG. 12B and FIG. 12C illustrate a longitudinal aberration curve, an astigmatic curve and a distortion curve of the camera lens assembly according to Embodiment 6, respectively.
Figure 12B:
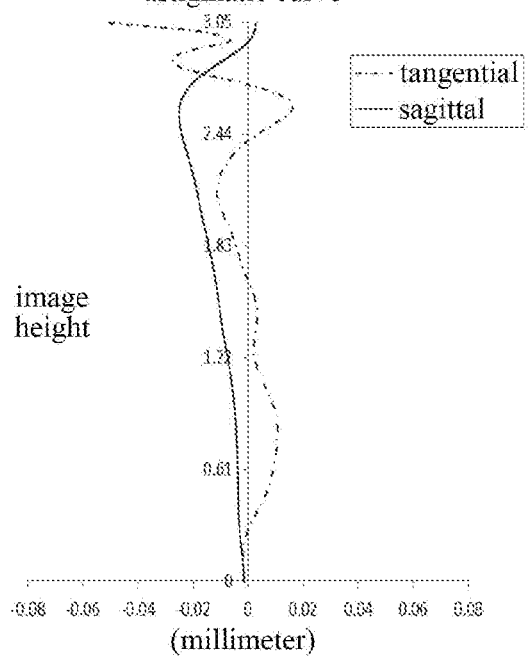
Figure 12C:
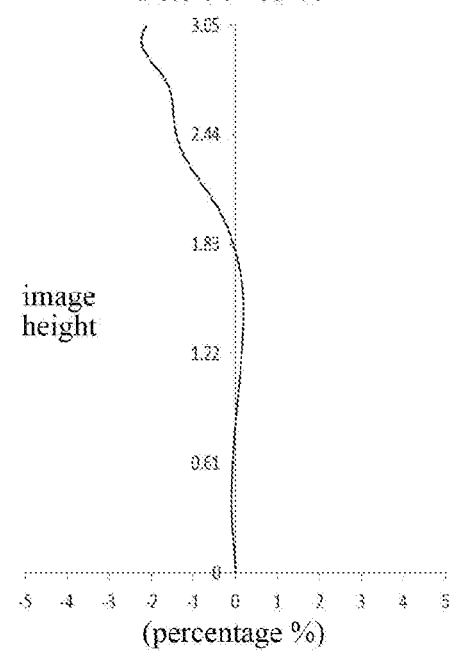

FIG. 12A shows a longitudinal aberration curve of the camera lens assembly according to Embodiment 6, representing deviations of focal points of light of different wavelengths converged after passing through a camera lens assembly. FIG. 12B shows an astigmatic curve of the camera lens assembly according to Embodiment 6, representing a curvature of a tangential image plane and a curvature of a sagittal image plane. FIG. 12C shows a distortion curve of the camera lens assembly according to Embodiment 6, representing amounts of distortion at different viewing angles. It can be seen from FIG. 12A to FIG. 12C that the camera lens assembly according to Embodiment 6 can achieve good imaging quality.

Embodiment 7

The camera lens assembly according to Embodiment 7 of the present disclosure is described below with reference to FIG. 13 to FIG. 14C.

Figure 13:
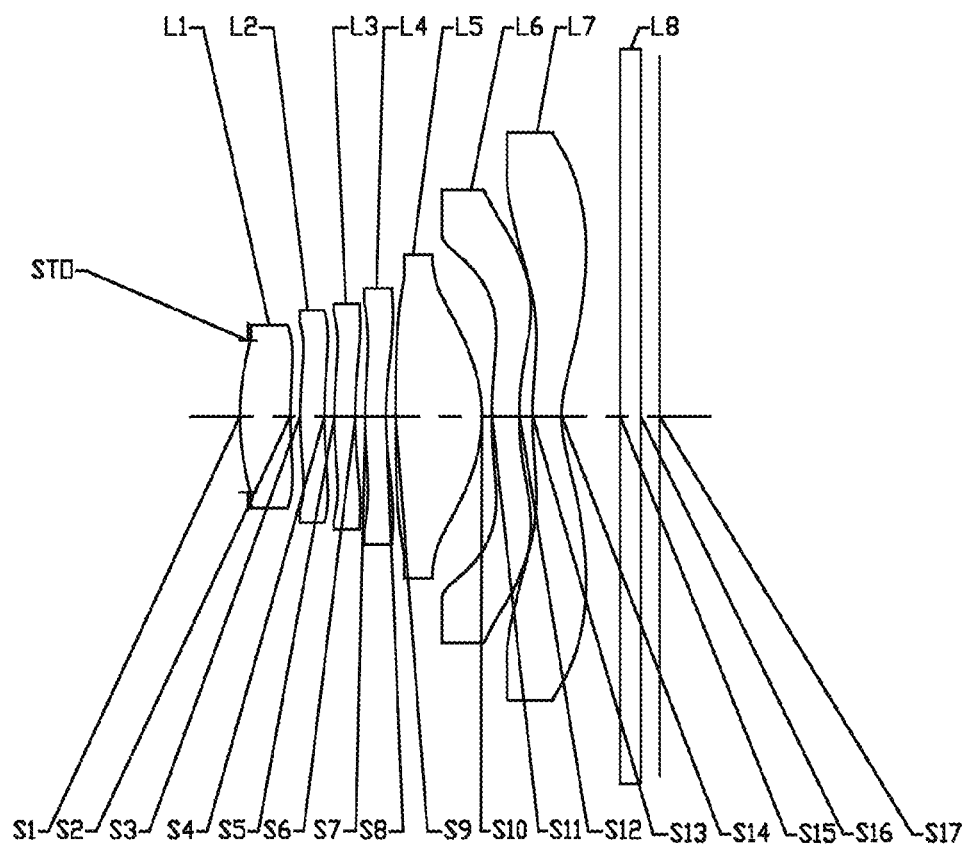
FIG. 13 is a schematic structural diagram illustrating a camera lens assembly according to Embodiment 7 of the present disclosure.

FIG. 13 illustrates a schematic structural diagram of the camera lens assembly according to Embodiment 7 of the present disclosure. As shown in FIG. 14, the camera lens assembly according to Embodiment 7 includes the first to seventh lenses L1 to L7 each having an object-side surface and an image-side surface. Table 19 shows the surface type, the radius of curvature, the thickness, the material and the conic coefficient of each lens of the camera lens assembly in Embodiment 7. Table 20 shows the higher-order coefficients of each aspheric mirror surface in Embodiment 7. Table 21 shows the effective focal lengths f1 to f7 of the lenses, the total effective focal length f of the imaging lens assembly of the camera lens assembly, the half of the diagonal length ImgH of the effective pixel area of the electronic photosensitive element of the camera lens assembly, the half of the maximal field-of-view HFOV of the camera lens assembly, and the distance TTL from the object-side surface S1 of the first lens L1 to the image plane S17 of the camera lens assembly on the optical axis in Embodiment 7. Here, each aspheric surface type may be defined by the formula (1) given in the above Embodiment 1.

TABLE 19

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.0827 | | | |
| S1 | aspheric | 1.9267 | 0.5136 | 1.546 | 56.11 | −0.3029 |
| S2 | aspheric | 3.5669 | 0.1000 | | | −70.0647 |
| S3 | aspheric | 3.4108 | 0.2479 | 1.656 | 21.52 | −13.9951 |
| S4 | aspheric | 4.2080 | 0.1001 | | | −50.7473 |
| S5 | aspheric | 3.0557 | 0.2114 | 1.656 | 21.52 | −16.3219 |
| S6 | aspheric | 3.1745 | 0.1015 | | | −24.3645 |
| S7 | aspheric | 3.0271 | 0.2105 | 1.656 | 21.52 | −93.5876 |
| S8 | aspheric | 2.4043 | 0.1001 | | | −22.6762 |
| S9 | aspheric | 50.0000 | 0.8785 | 1.546 | 56.11 | 66.4306 |
| S10 | aspheric | −1.1138 | 0.1001 | | | −3.0019 |
| S11 | aspheric | 3.8022 | 0.2811 | 1.656 | 21.52 | −101.0183 |
| S12 | aspheric | 2.5367 | 0.1323 | | | −39.4121 |
| S13 | aspheric | 2.9311 | 0.2960 | 1.546 | 56.11 | 0.5880 |
| S14 | aspheric | 0.9125 | 0.5956 | | | −4.9690 |
| S15 | spherical | infinite | 0.2100 | 1.517 | 64.17 | |
| S16 | spherical | infinite | 0.1925 | | | |
| S17 | spherical | infinite | | | | |

TABLE 20

| surface number | A4 | A6 | A8 | A10 | A12 |
|---|---|---|---|---|---|
| S1 | −3.7785E−02 | 6.7372E−01 | −8.3423E+00 | 4.4360E+01 | −1.2234E+02 |
| S2 | −1.2369E−01 | 7.0766E−01 | −5.8219E+00 | 1.8180E+01 | −3.1224E+01 |
| S3 | −7.1397E−02 | 5.7666E−02 | −1.5389E+00 | 4.5330E+00 | −8.4918E+00 |
| S4 | 3.6925E−02 | −1.4167E−01 | −1.1943E−01 | 3.2391E−01 | −7.0879E−01 |
| S5 | −1.9623E−01 | 8.2107E−01 | −4.0205E+00 | 1.0265E+01 | −1.5598E+01 |
| S6 | −7.6867E−02 | 3.9099E−01 | −1.6412E+00 | 3.1161E+00 | −3.3134E+00 |
| S7 | 1.0329E−01 | −1.1287E+00 | 3.3157E+00 | −6.1607E+00 | 7.1031E+00 |
| S8 | 4.8885E−02 | −4.7698E−01 | 9.9194E−01 | −1.3722E+00 | 1.2454E+00 |
| S9 | 3.5902E−02 | 1.3595E−01 | −4.5997E−01 | 6.3089E−01 | −4.3176E−01 |
| S10 | −2.8794E−02 | −2.3891E−01 | 6.3925E−01 | −8.6311E−01 | 6.7610E−01 |
| S11 | 2.3106E−01 | −8.1060E−01 | 9.5742E−01 | −5.6199E−01 | −4.1272E−02 |
| S12 | 4.5022E−01 | −1.1619E+00 | 1.4424E+00 | −1.1987E+00 | 6.7111E−01 |
| S13 | −2.4042E−01 | 1.3226E−01 | −1.5431E−01 | 1.5044E−01 | −8.1540E−02 |

TABLE 20-continued

| S14 | −2.1424E−01 | 1.6768E−01 | −8.8350E−02 | 3.4855E−02 | −1.0679E−02 |

| surface number | A14 | A16 | A18 | A20 |
| --- | --- | --- | --- | --- |
| S1 | 1.6967E+02 | −9.4047E+01 | 0.0000E+00 | 0.0000E+00 |
| S2 | 2.7822E+01 | −9.8383E+00 | 0.0000E+00 | 0.0000E+00 |
| S3 | 8.7874E+00 | −3.5398E+00 | 0.0000E+00 | 0.0000E+00 |
| S4 | 7.7306E−01 | −2.8310E−01 | 0.0000E+00 | 0.0000E+00 |
| S5 | 1.2697E+01 | −4.1308E+00 | 0.0000E+00 | 0.0000E+00 |
| S6 | 1.8743E+00 | −4.1527E−01 | 0.0000E+00 | 0.0000E+00 |
| S7 | −4.4997E+00 | 1.1782E+00 | 0.0000E+00 | 0.0000E+00 |
| S8 | −6.3512E−01 | 1.3501E−01 | 0.0000E+00 | 0.0000E+00 |
| S9 | 1.4837E−01 | −2.1391E−02 | 0.0000E+00 | 0.0000E+00 |
| S10 | −2.6796E−01 | 4.1145E−02 | 0.0000E+00 | 0.0000E+00 |
| S11 | 2.9329E−01 | −1.8837E−01 | 5.2136E−02 | −5.4856E−03 |
| S12 | −2.4383E−01 | 5.4443E−02 | −6.7442E−03 | 3.5343E−04 |
| S13 | 2.5299E−02 | −4.5379E−03 | 4.4005E−04 | −1.7932E−05 |
| S14 | 2.3576E−03 | −3.3534E−04 | 2.6765E−05 | −8.9918E−07 |

TABLE 21

| ImgH(mm) | 2.93 |
| --- | --- |
| HFOV(°) | 46.86/46.9 |
| f(mm) | 2.90 |
| f1(mm) | 6.91 |
| f2(mm) | 24.42 |
| f3(mm) | 72.95 |
| f4(mm) | −20.55 |
| f5(mm) | 2.01 |
| f6(mm) | −12.73 |
| f7(mm) | −2.56 |
| TTL(mm) | 4.27 |

Figure 14A:
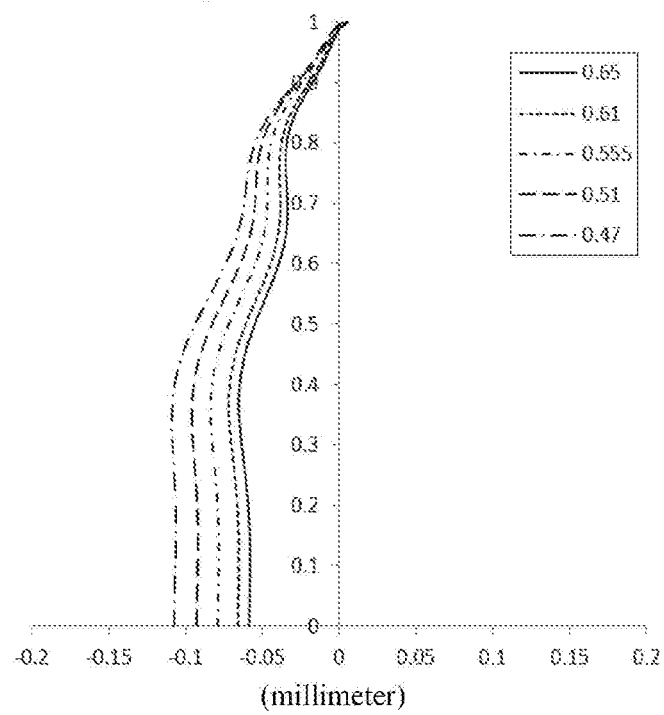
FIG. 14A, FIG. 14B and FIG. 14C illustrate a longitudinal aberration curve, an astigmatic curve and a distortion curve of the camera lens assembly according to Embodiment 7, respectively.
Figure 14B:
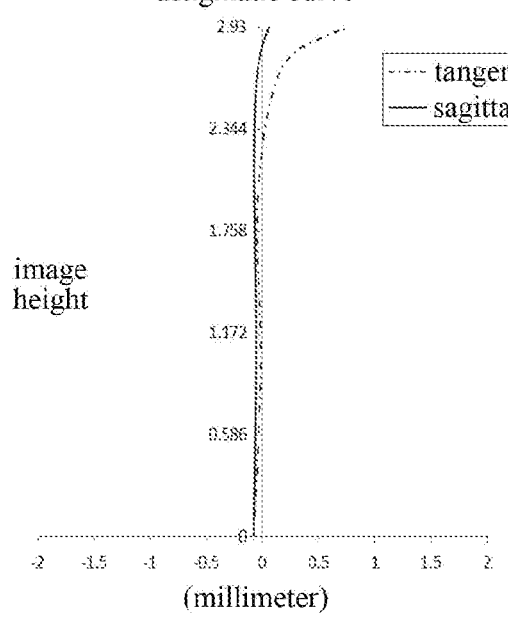
Figure 14C:
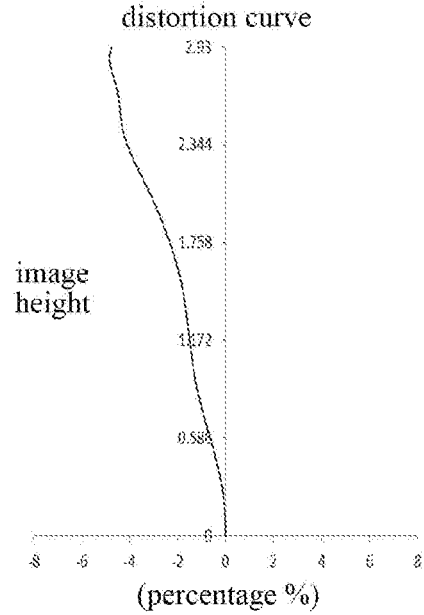

FIG. 14A shows a longitudinal aberration curve of the camera lens assembly according to Embodiment 7, representing deviations of focal points of light of different wavelengths converged after passing through a camera lens assembly. FIG. 14B shows an astigmatic curve of the camera lens assembly according to Embodiment 7, representing a curvature of a tangential image plane and a curvature of a sagittal image plane. FIG. 14C shows a distortion curve of the camera lens assembly according to Embodiment 7, representing amounts of distortion at different viewing angles. It can be seen from FIG. 14A to FIG. 14C that the camera lens assembly according to Embodiment 7 can achieve good imaging quality.

To sum up, Embodiment 1 to Embodiment 7 respectively satisfy the relationships shown in Table 22 below.

TABLE 22

| Conditional Formula | Embodiment | | | | | | |
| --- | --- | --- | --- | --- | --- | --- | --- |
| | 1 | 2 | 3 | 4 | 5 | 6 | 7 |
| f1/f5 | 2.10 | 2.17 | 2.19 | 2.57 | 2.51 | 2.51 | 3.44 |
| ImgH/f | 1.02 | 1.01 | 1.01 | 1.01 | 1.01 | 1.02 | 1.01 |
| TTL/ImgH | 1.40 | 1.40 | 1.40 | 1.40 | 1.40 | 1.40 | 1.46 |
| CT5/CT7 | 2.83 | 2.81 | 2.78 | 2.79 | 2.81 | 2.87 | 2.97 |
| R5/R6 | 0.96 | 0.86 | 0.81 | 0.90 | 0.84 | 1.26 | 0.96 |
| (CT6 + CT7)/CT5 | 0.68 | 0.69 | 0.69 | 0.68 | 0.69 | 0.67 | 0.66 |
| ΣT/TTL | 0.15 | 0.15 | 0.15 | 0.16 | 0.16 | 0.15 | 0.15 |
| SAG61/SAG62 | 0.79 | 1.35 | 1.34 | 1.33 | 1.34 | 1.46 | 1.38 |
| DT12/DT22 | 0.89 | 0.86 | 0.86 | 0.86 | 0.86 | 0.86 | 0.86 |

The foregoing is only a description of the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present disclosure with (but not limited to) technical features having similar functions.

What is claimed is:

1. A camera lens assembly comprising, sequentially along an optical axis from an object side to an image side, a first lens, a second lens, a third lens, a fourth lens, a fifth lens, a sixth lens and a seventh lens,
wherein the first lens has a positive refractive power;
each of the second lens, the third lens and the fourth lens has a positive refractive power or a negative refractive power;
the fifth lens has a positive refractive power, and an image-side surface of the fifth lens is a convex surface;
the sixth lens has a negative refractive power;
the seventh lens has a negative refractive power, and an object-side surface of the seventh lens is a convex surface; and
an effective focal length f1 of the first lens and an effective focal length f5 of the fifth lens satisfy: 1.5<f1/f5<3.5, wherein an object-side surface of the third lens is a convex surface, and an image-side surface of the third lens is a concave surface.

2. The camera lens assembly according to claim 1, wherein a distance TTL from an object-side surface of the first lens to an image plane of the camera lens assembly on the optical axis and half of a diagonal length ImgH of an effective pixel area of an electronic photosensitive element of the camera lens assembly satisfy: TTL/ImgH<1.5.

3. The camera lens assembly according to claim 1, wherein a radius of curvature R5 of the object-side surface of the third lens and a radius of curvature R6 of the image-side surface of the third lens satisfy: 0.8<R5/R6<1.3.

4. The camera lens assembly according to claim 1, wherein a center thickness CT5 of the fifth lens on the optical axis and a center thickness CT7 of the seventh lens on the optical axis satisfy: 2.2<CT5/CT7<3.

5. The camera lens assembly according to claim 1, wherein a sum of spacing distances ΣT between any two adjacent lenses from the first lens to the seventh lens on the optical axis and a distance TTL from an object-side surface of the first lens to an image plane of the camera lens assembly on the optical axis satisfy: $\Sigma T/TTL<0.2$.

6. A camera lens assembly comprising, sequentially along an optical axis from an object side to an image side, a first lens, a second lens, a third lens, a fourth lens, a fifth lens, a sixth lens and a seventh lens,
wherein the first lens has a positive refractive power;
at least one of the second lens, the third lens, or the fourth lens has a positive refractive power or a negative refractive power;
the fifth lens has a positive refractive power, and an image-side surface of the fifth lens is a convex surface;
the sixth lens has a negative refractive power;
the seventh lens has a negative refractive power, and an object-side surface of the seventh lens is a convex surface; and
half of a diagonal length ImgH of an effective pixel area of an electronic photosensitive element of the camera lens assembly and an effective focal length f of the camera lens assembly satisfy: ImgH/f>0.85,
wherein a center thickness CT5 of the fifth lens on the optical axis and a center thickness CT7 of the seventh lens on the optical axis satisfy: $2.2<CT5/CT7<3$.

7. The camera lens assembly according to claim 6, wherein the third lens has a positive refractive power or a negative refractive power, an object-side surface of the third lens is a convex surface, and an image-side surface of the third lens is a concave surface.

8. The camera lens assembly according to claim 6, wherein the second lens, the third lens, and the fourth lens each has a positive refractive power or a negative refractive power.

9. The camera lens assembly according to claim 6, wherein a distance TTL from an object-side surface of the first lens to an image plane of the camera lens assembly on the optical axis and the half of the diagonal length ImgH of the effective pixel area of the electronic photosensitive element of the camera lens assembly satisfy: TTL/ImgH<1.5.

10. The camera lens assembly according to claim 6, wherein a radius of curvature R5 of the object-side surface of the third lens and a radius of curvature R6 of the image-side surface of the third lens satisfy: $0.8<R5/R6<1.3$.

11. The camera lens assembly according to claim 6, wherein a sum of spacing distances $\Sigma T$ between any two adjacent lenses from the first lens to the seventh lens on the optical axis and a distance TTL from an object-side surface of the first lens to an image plane of the camera lens assembly on the optical axis satisfy: $\Sigma T/TTL<0.2$.

12. A camera lens assembly comprising, sequentially along an optical axis from an object side to an image side, a first lens, a second lens, a third lens, a fourth lens, a fifth lens, a sixth lens and a seventh lens, wherein the first lens has a positive refractive power; at least one of the second lens, the third lens, or the fourth lens has a positive refractive power or a negative refractive power; the fifth lens has a positive refractive power, and an image-side surface of the fifth lens is a convex surface; the sixth lens has a negative refractive power; the seventh lens has a negative refractive power, and an object-side surface of the seventh lens is a convex surface; and an effective radius DT12 of an image-side surface of the first lens and an effective radius DT22 of an image-side surface of the second lens satisfy: $0.7<DT12/DT22<1$, wherein a distance TTL from an object-side surface of the first lens to an image plane of the camera lens assembly on the optical axis and half of a diagonal length ImgH of an effective pixel area of an electronic photosensitive element of the camera lens assembly satisfy: TTL/ImgH<1.5.

13. The camera lens assembly according to claim 12, wherein the third lens has a positive refractive power or a negative refractive power, an object-side surface of the third lens is a convex surface, and an image-side surface of the third lens is a concave surface.

14. The camera lens assembly according to claim 12, wherein the second lens, the third lens, and the fourth lens each has a positive refractive power or a negative refractive power.

15. The camera lens assembly according to claim 12, wherein a center thickness CT5 of the fifth lens on the optical axis and a center thickness CT7 of the seventh lens on the optical axis satisfy: $2.2<CT5/CT7<3$.

16. The camera lens assembly according to claim 12, wherein a sum of spacing distances $\Sigma T$ between any two adjacent lenses from the first lens to the seventh lens on the optical axis and a distance TTL from an object-side surface of the first lens to an image plane of the camera lens assembly on the optical axis satisfy: $\Sigma T/TTL<0.2$.

* * * * *